(12) United States Patent
Rofougaran

(10) Patent No.: US 8,175,646 B2
(45) Date of Patent: May 8, 2012

(54) NETWORKING OF MULTIPLE MODE HANDHELD COMPUTING UNIT

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 518 days.

(21) Appl. No.: 12/393,448

(22) Filed: Feb. 26, 2009

(65) Prior Publication Data

US 2009/0197644 A1 Aug. 6, 2009

Related U.S. Application Data

(63) Continuation-in-part of application No. 12/026,681, filed on Feb. 6, 2008.

(51) Int. Cl.
*H04B 1/38* (2006.01)
(52) U.S. Cl. ....... 455/557; 455/90.1; 455/90.2; 370/310
(58) Field of Classification Search ................. 455/66.1, 455/74, 90.1, 90.2, 90.3, 557; 370/310
See application file for complete search history.

(56) References Cited

U.S. PATENT DOCUMENTS

| | | | |
|---|---|---|---|
| 4,807,183 A | 2/1989 | Kung | |
| 5,502,683 A | 3/1996 | Marchioro | |
| 5,754,948 A * | 5/1998 | Metze | 455/41.2 |
| 5,786,912 A | 7/1998 | Kartalopoulos | |
| 5,809,321 A | 9/1998 | Hansen | |
| 5,884,104 A | 3/1999 | Chase | |
| 6,182,203 B1 | 1/2001 | Simar | |
| 6,438,622 B1 | 8/2002 | Haghighi et al. | |
| 6,500,070 B1 | 12/2002 | Tomizawa et al. | |
| 6,663,295 B2 | 12/2003 | Kami et al. | |
| 6,735,663 B2 | 5/2004 | Watts, Jr. et al. | |
| 6,735,708 B2 | 5/2004 | Watts, Jr. | |
| 6,801,974 B1 | 10/2004 | Watts, Jr. et al. | |
| 6,816,925 B2 | 11/2004 | Watts, Jr. | |
| 7,065,326 B2 | 6/2006 | Lovberg | |
| 7,082,285 B2 | 7/2006 | Linde | |
| 7,149,837 B2 | 12/2006 | Watts, Jr. et al. | |
| 7,159,099 B2 | 1/2007 | Lucas | |

(Continued)

FOREIGN PATENT DOCUMENTS

EP 1499070 A2 1/2005

(Continued)

OTHER PUBLICATIONS

Bruce K Gale, "RF, Electrical, and Magnetic Microsystems," Apr. 16, 2002, 8 pages.

(Continued)

*Primary Examiner* — Tuan H Nguyen
(74) *Attorney, Agent, or Firm* — Garlick & Markison; Timothy W. Markison; Jessica W. Smith

(57) ABSTRACT

A handheld computing unit includes a MMW transceiver, a hardware section, an operating system section, and an application section. When the handheld computing unit is in a extended mode: the hardware section is operably coupled to a hardware section of an extended computing unit; the operating system section is operably coupled to an operating system section of the extended computing unit; and the application section is operably coupled to an application section of the extended computing unit. When the handheld computing unit is in a network mode the hardware section is operably coupled to a hardware section of at least one other handheld computing unit.

24 Claims, 17 Drawing Sheets

U.S. PATENT DOCUMENTS

| | | |
|---|---|---|
| 7,171,050 B2 | 1/2007 | Kim |
| 7,197,584 B2 | 3/2007 | Huber et al. |
| 7,218,143 B1 | 5/2007 | Young |
| 7,257,093 B1 | 8/2007 | Witzke |
| 7,330,702 B2 | 2/2008 | Chen et al. |
| 7,406,062 B2 | 7/2008 | Hsu |
| 7,444,393 B2 | 10/2008 | Chung |
| 7,903,724 B2 | 3/2011 | Rofougaran |
| 7,929,474 B2 | 4/2011 | Pettus |
| 2002/0022521 A1 | 2/2002 | Idaka |
| 2002/0049806 A1 | 4/2002 | Gatz et al. |
| 2002/0061012 A1 | 5/2002 | Thi |
| 2002/0107010 A1 | 8/2002 | Witte |
| 2002/0164945 A1 | 11/2002 | Olsen |
| 2003/0001882 A1 | 1/2003 | Macer et al. |
| 2003/0013411 A1* | 1/2003 | Uchiyama ............... 455/40 |
| 2003/0017845 A1 | 1/2003 | Doviak |
| 2003/0040284 A1 | 2/2003 | Sato |
| 2003/0059022 A1 | 3/2003 | Nebiker |
| 2003/0078071 A1 | 4/2003 | Uchimyama |
| 2003/0112585 A1 | 6/2003 | Silvester |
| 2003/0126335 A1 | 7/2003 | Silvester |
| 2003/0128712 A1 | 7/2003 | Moriwaki |
| 2003/0162503 A1 | 8/2003 | LeCren |
| 2003/0172380 A1 | 9/2003 | Kikinis |
| 2003/0221036 A1 | 11/2003 | Konetski |
| 2004/0054776 A1 | 3/2004 | Klotz |
| 2004/0062308 A1 | 4/2004 | Kamosa |
| 2004/0117442 A1 | 6/2004 | Thielen |
| 2004/0123113 A1 | 6/2004 | Mathiassen et al. |
| 2004/0153863 A1 | 8/2004 | Klotz |
| 2004/0157559 A1 | 8/2004 | Sugikawa |
| 2004/0174431 A1 | 9/2004 | Stienstra |
| 2004/0203364 A1 | 10/2004 | Silvester |
| 2004/0266336 A1 | 12/2004 | Patsiokas et al. |
| 2005/0014468 A1 | 1/2005 | Salokannel |
| 2005/0060598 A1 | 3/2005 | Klotz |
| 2005/0124307 A1 | 6/2005 | Ammar et al. |
| 2005/0185364 A1 | 8/2005 | Bell |
| 2005/0250531 A1 | 11/2005 | Takebe et al. |
| 2006/0026348 A1 | 2/2006 | Wallace |
| 2006/0038731 A1 | 2/2006 | Turner |
| 2006/0046762 A1 | 3/2006 | Yoon et al. |
| 2006/0085675 A1 | 4/2006 | Popell |
| 2006/0101164 A1 | 5/2006 | Lee |
| 2006/0148568 A1 | 7/2006 | Schultz et al. |
| 2006/0164271 A1 | 7/2006 | Hirt |
| 2006/0167784 A1 | 7/2006 | Hoffberg |
| 2006/0176851 A1 | 8/2006 | Bennett |
| 2006/0190691 A1 | 8/2006 | Chauve |
| 2006/0203758 A1 | 9/2006 | Tee et al. |
| 2006/0252470 A1 | 11/2006 | Seshadri |
| 2006/0260546 A1 | 11/2006 | Usami |
| 2006/0262026 A1 | 11/2006 | Gainey et al. |
| 2006/0269004 A1 | 11/2006 | Ibrahim |
| 2006/0282635 A1 | 12/2006 | Mather |
| 2007/0015558 A1 | 1/2007 | Zalewski et al. |
| 2007/0038808 A1 | 2/2007 | Yim |
| 2007/0147152 A1 | 6/2007 | Sekiguchi |
| 2007/0155502 A1 | 7/2007 | Wu |
| 2007/0167149 A1 | 7/2007 | Comstock |
| 2007/0229270 A1 | 10/2007 | Rofougaran |
| 2007/0239929 A1 | 10/2007 | Chen |
| 2007/0268481 A1 | 11/2007 | Raskar et al. |
| 2007/0298882 A1 | 12/2007 | Marks et al. |
| 2008/0020843 A1 | 1/2008 | Wolinsky |
| 2008/0028118 A1 | 1/2008 | Sayers et al. |
| 2008/0040541 A1 | 2/2008 | Borckmann |
| 2008/0063236 A1 | 3/2008 | Ikenoue et al. |
| 2008/0070516 A1 | 3/2008 | Lee |
| 2008/0076406 A1 | 3/2008 | Chen |
| 2008/0151847 A1 | 6/2008 | Abujbara |
| 2009/0006640 A1 | 1/2009 | Brouwer |
| 2009/0198854 A1 | 8/2009 | Rofougaran |
| 2009/0215533 A1 | 8/2009 | Zalewski et al. |
| 2010/0146199 A1 | 6/2010 | Shaeffer |

FOREIGN PATENT DOCUMENTS

| | | |
|---|---|---|
| WO | 2009002464 A2 | 12/2008 |

OTHER PUBLICATIONS

Dr. Lynn Fuller, "Microelectromechanical Systems (MEMs) Applications—Microphones,"Rochester Institute of Technology Microelectronic Engineering, Apr. 25, 2005, pp. 1-43.

Radio Control Adapter; IBM Technical Disclosure Bulletin NN86081337; IBM; Aug. 1, 1986.

Xilinx Inc.: Spartan-3AN FPGA Family Data Sheet, DS557, Jun. 2, 2008, p. 5.

Haworth, et al.; Public Security Screening for Metallic Objects with Millimetre-Wave Images; Heriot-Watt University; United Kingdom; Jun. 7-8, 2005; pp. 1-4.

Elsadek, et al.; "A Compact 3-D Microwave Holographic Pointer System Using a Size Reduced Microstrip Planar Array"; Department of Electrical and Computer Engineering; University of California; Oct. 7-10, 2011; pp. 1-5.

Elsadek, et al.; "Microstrip Multi-element Diversity Antenna Array for Three Dimensional Microwave Holographic Input Pointer (Holo3D)"; Department of Electrical and Computer Engineering; University of California; Aug. 7, 2002, pp. 1-4.

E3 Wii Controller; Nintendo Wilmote; Technology Limitations; Xgaming, Inc.; 2005; pp. 1-5.

* cited by examiner

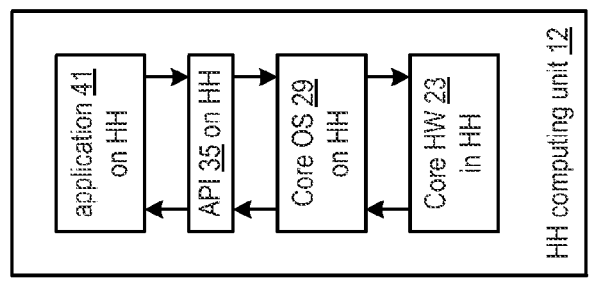
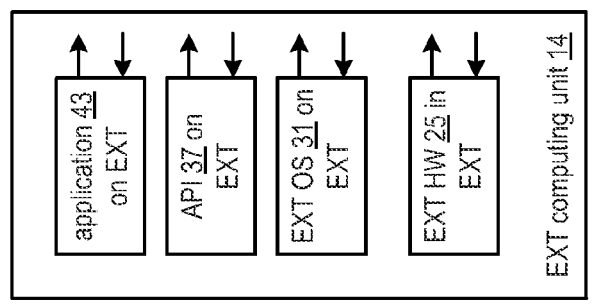
FIG. 6
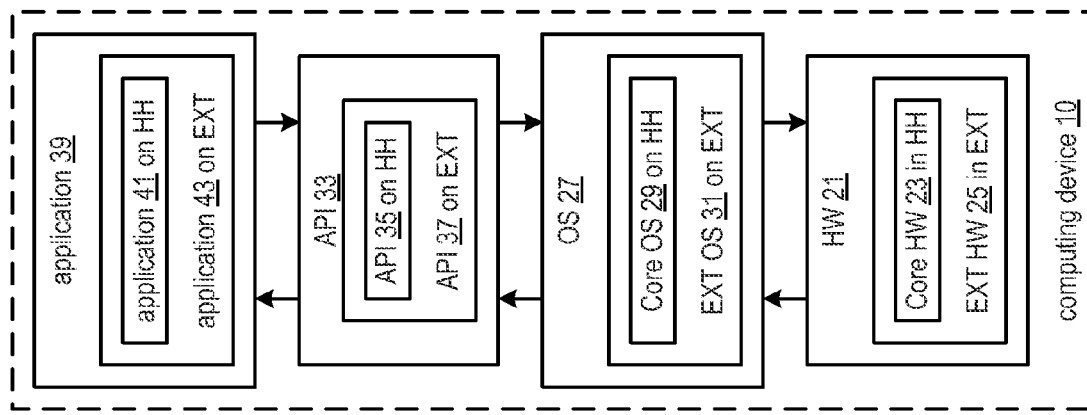
FIG. 5 attribute mapping 240

| hardware | | operating system | | user application | | system application | |
|---|---|---|---|---|---|---|---|
| device | feature | device | feature | device | feature | device | feature |
| HH-1 | 1.8 GHz processor hi-resolution display keypad peripherals | HH-1 | HH OS v1.0 | HH-1 | word processing WCDMA EDGE | HH-1 | BIOS v1.0 GUI drivers utility SW |
| HH_2 | 2.0 GHz processor touch pad GUI peripherals | HH_2 | HH OS v2.0 user appl OS sys appl OS comm OS | HH_2 | spreadsheet WCDMA EDGE | HH_2 | BIOS v2.0 GUI v2.0 drivers utility SW |
| HH_3 | 1.6 GHz processor keypad graphic display peripherals | HH_3 | HH OS v1.0 | HH_3 | WCDMA EDGE | HH_3 | BIOS v1.0 GUI drivers utility SW |

FIG. 17

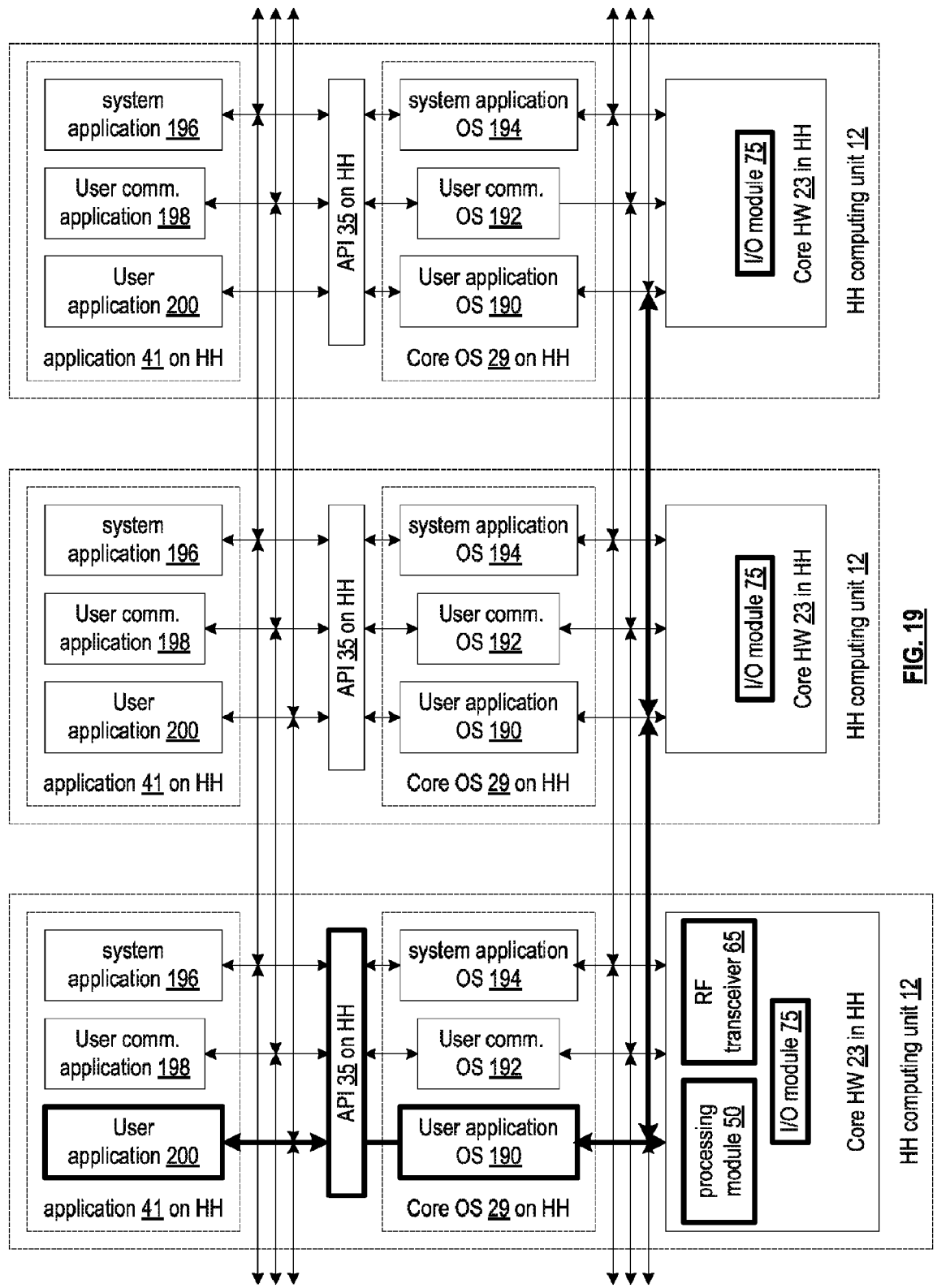

NETWORKING OF MULTIPLE MODE HANDHELD COMPUTING UNIT

This patent application is claiming priority under 35 USC §120 as a continuation in part patent application of co-pending patent application entitled COMPUTING DEVICE WITH HANDHELD AND EXTENDED COMPUTING UNITS, having a filing date of Feb. 6, 2008.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to communication systems and more particularly to computing devices used in such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. In general, the memory stores operating instructions that the processing core uses to generate data, which may also be stored in the memory. The peripheral devices allow a user of the communication device to direct the processing core as to which operating instructions to execute, to enter data, etc. and to see the resulting data. For example, a personal computer includes a keyboard, a mouse, and a display, which a user uses to cause the processing core to execute one or more of a plurality of applications.

While the various communication devices have a similar basic architecture, they each have their own processing core, memory, and peripheral devices and provide distinctly different functions. For example, a cellular telephone is designed to provide wireless voice and/or data communications in accordance with one or more wireless communication standards (e.g., IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof). As another example, a personal digital audio player is designed to decompress a stored digital audio file and render the decompressed digital audio file audible.

Over the past few years, integration of the some of the communication device functions into a single device has occurred. For example, many cellular telephones now offer personal digital audio playback functions, PDA functions, and/or GPS receiver functions. Typically, to load one or more of these functions, files, or other applications onto a handheld communication device (e.g., a cellular telephone, a personal digital audio and/or video player, a PDA, a GPS receiver), the handheld communication device needs to be coupled to a personal computer or laptop computer. In this instance, the desired application, function, and/or file is first loaded on to the computer and then copied to the handheld communication device; resulting in two copies of the application, function, and/or file.

To facilitate such loading of the application, function, and/or file in this manner, the handheld communication device and the computer each require hardware and corresponding software to transfer the application, function, and/or file from the computer to the handheld communication device. As such, two copies of the corresponding software exist as well as having two hardware components (one for the handheld device and the second for the computer). In addition to the redundancy of software, timing issues, different versions of the software, incompatible hardware, and a plethora of other reasons cause the transfer of the application, function, and/or file to fail.

In addition to integration of some functions into a single handheld device, handheld digital audio players may be docked into a speaker system to provide audible signals via the speakers as opposed to a headphone. Similarly, a laptop computer may be docked to provide connection to a full size keyboard, a separate monitor, a printer, and a mouse. In each of these docking systems, the core architecture is not changed.

Due to the portable nature of the handheld devices and the increasing functionality of them, there may arise situations where it is desirable to form an ad hoc wireless network between two or more handheld devices. There are a variety of current implementations for facilitating wireless communication between two or more handheld devices. Such implementations include Bluetooth connections, infrared connections, direct connection IEEE 802.11, etc. While each of these implementations allow devices to communication with each other directly, they lack an extend mode of operation.

Therefore, a need exists for a computing device that includes a handheld computing unit and an extended computing unit, wherein the handheld computing unit may function in a network mode.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 5 is a schematic block diagram of an embodiment of a computing device that includes the handheld computing unit and the extended computing unit in accordance with the present invention;

FIG. 6 is a schematic block diagram of another embodiment of a handheld computing unit in a remote mode with respect to an extended computing unit in accordance with the present invention;

FIG. 17 is a diagram of an embodiment of an example of an attribute mapping table in accordance with the present invention;

FIG. 19 is a schematic block diagram of another embodiment of a networked computing device that includes a plurality of handheld computing units in accordance with the present invention.

DETAILED DESCRIPTION OF THE INVENTION

Figure 1:
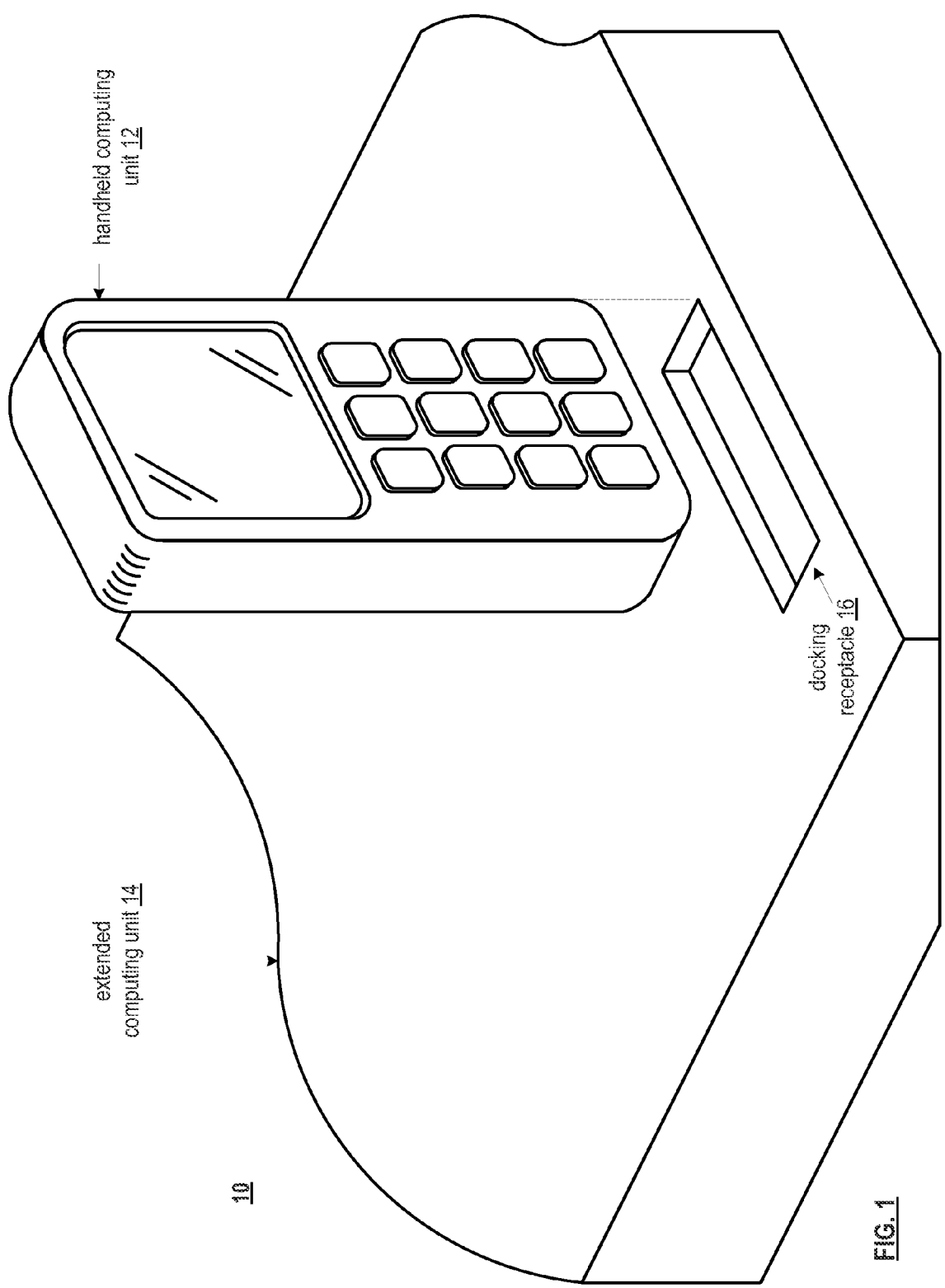
FIG. 1 is a diagram of an embodiment of a handheld computing unit and an extended computing unit in accordance with the present invention.

FIG. 1 is a diagram of an embodiment of a computing device 10 that includes a handheld computing unit 12 and an extended computing unit 14. The handheld computing unit 12 may have a form factor similar to a cellular telephone, personal digital assistant, personal digital audio/video player, etc. and includes a connector structure that couples to a docketing receptacle 16 of the extended computing unit 14.

In general, the handheld computing unit 12 includes the primary processing module (e.g., central processing unit), the primary main memory, and the primary hard disk memory for the computing device 10. In this manner, the handheld computing unit 12 functions as the core of a personal computer (PC) or laptop computer when it is docked to the extended computing unit and functions as a cellular telephone, a GPS receiver, a personal digital audio player, a personal digital video player, a personal digital assistant, and/or other handheld electronic device when it is not docked to the extended computing unit.

In addition, when the handheld computing unit 12 is docked to the extended computing unit 14, files and/or applications can be swapped therebetween. For example, assume that the user of the computing device 10 has created a presentation using presentation software and both reside in memory of the extended computing unit 14. The user may elect to transfer the presentation file and the presentation software to memory of the handheld computing unit 12. If the handheld computing unit 12 has sufficient memory to store the presentation file and application, then it is copied from the extended computing unit memory to the handheld computing unit memory. If there is not sufficient memory in the handheld computing unit, the user may transfer an application and/or file from the handheld computing unit memory to the extended computing unit memory to make room for the presentation file and application.

With the handheld computing unit 12 including the primary components for the computing device 10, there is only one copy of an application and/or of a file to support PC functionality, laptop functionality, and a plurality of handheld device functionality (e.g., TV, digital audio/video player, cell phone, PDA, GPS receiver, etc.). In addition, since only one copy of an application and/or of a file exists (other than desired backups), special software to transfer the applications and/or files from a PC to a handheld device is no longer needed. As such, the processing module, main memory, and I/O interfaces of the handheld computing unit 12 provide a single core architecture for a PC and/or a laptop, a cellular telephone, a PDA, a GPS receiver, a personal digital audio player, a personal digital video player, etc.

Figure 2:
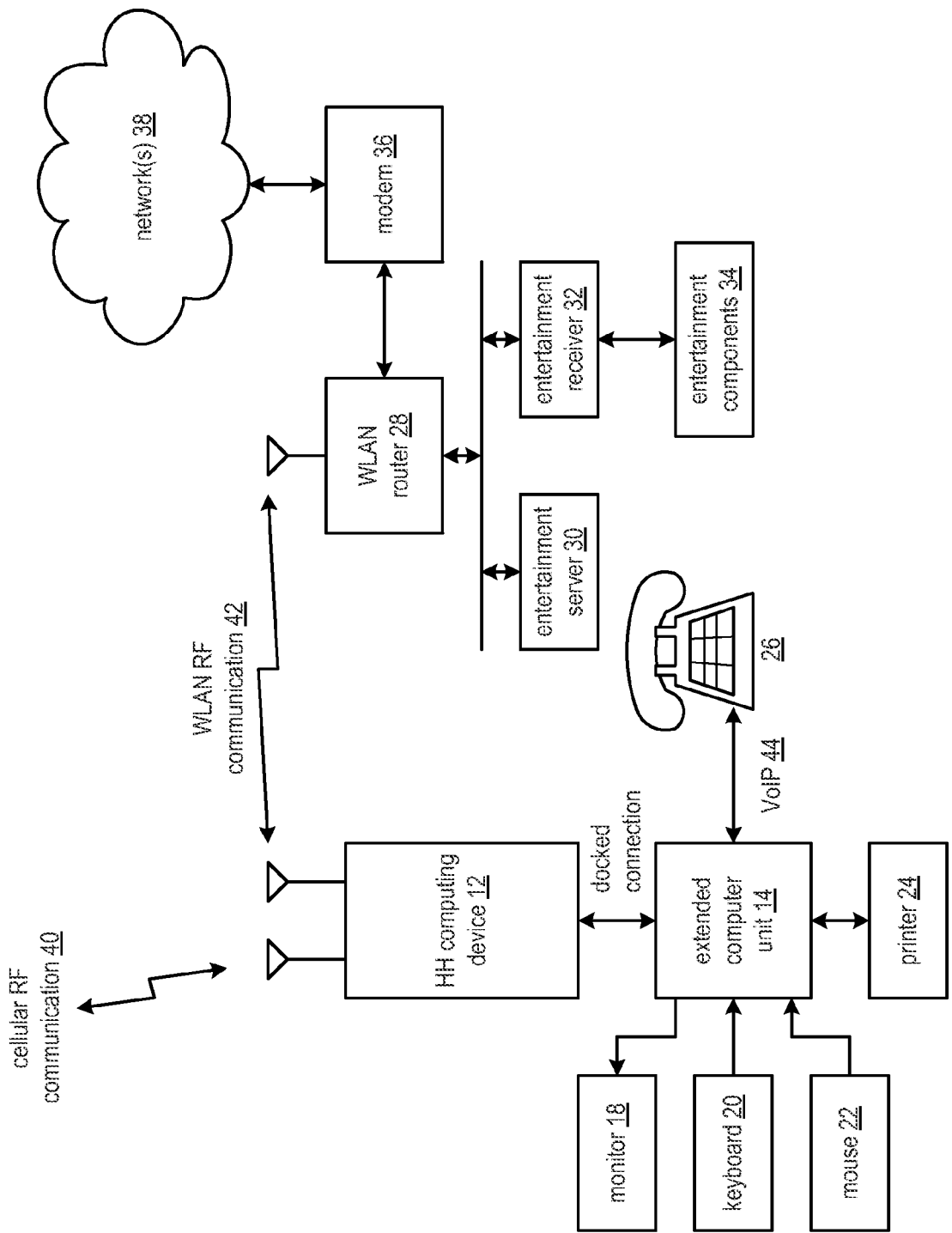
FIG. 2 is a schematic block diagram of an embodiment of a handheld computing unit docked to an extended computing unit within a communication system in accordance with the present invention.

FIG. 2 is a schematic block diagram of an embodiment of a handheld computing unit 12 docked to an extended computing unit 14 within a communication system. In this embodiment, the communication system may include one or more of a wireless local area network (WLAN) router 28, a modem 36 coupled to the one or more networks 38 (e.g., a wireless local area network, a wide area network, the internet, the public switch telephone network, etc.), an entertainment server 30 (e.g., a server coupled to database of movies, music, video games, etc.), an entertainment receiver 32, entertainment components 34 (e.g., speaker system, television monitor and/or projector, DVD (digital video disc) player or newer versions thereof, VCR (video cassette recorder), satellite set top box, cable set top box, video game console, etc.), and a voice over internet protocol (VoIP) phone 26. As an alternative or in addition to the WLAN router 28, the system may include a local area network (LAN) router coupled to the extended computing unit 14.

As is also shown, the extended computing unit 14 is coupled to a monitor 18, a keyboard, a mouse 22, and a printer 24. The extended computing unit 14 may also be coupled to other devices (not shown) such as a trackball, touch screen, gaming devices (e.g., joystick, game pad, game controller, etc.), an image scanner, a webcam, a microphone, speakers, and/or a headset. In addition, the extended computing unit 14 may have a form factor similar to a personal computer and/or a laptop computer. For example, for in-home or in-office use, having the extended computing unit with a form factor similar to a PC may be desirable. As another example, for traveling users, it may be more desirable to have a laptop form factor.

In this example, the handheld computing unit 12 is docked to the extended computer unit 14 and function together to provide the computing device 10. The docking of the handheld computing unit 12 to the extended computing unit 14 encompasses one or more high speed connections between the units 12 and 14. Such a high speed connection may be provided by an electrical connector, by an RF connector, by an electromagnetic connector, and/or a combination thereof. In this mode, the handheld computing unit 12 and the extended computing 14 collectively function similarly to a personal computer and/or laptop computer with a WLAN card and a cellular telephone card.

In this mode, the handheld computing unit 12 may transceive cellular RF communications 40 (e.g., voice and/or data communications). Outgoing voice signals may originate at the VoIP phone 26 as part of a VoIP communication 44 or a microphone coupled to the extended computing unit 14. The outgoing voice signals are converted into digital signals that are subsequently converted to outbound RF signals. Inbound RF signals are converted into incoming digital audio signals and that may be provided to a sound card within the extended computing unit for presentation on speakers or provided to the VoIP phone via as part of a VoIP communication 44.

Outgoing data signals may originate at the mouse 22, keyboard 20, image scanner, etc. coupled to the extended computing unit 14. The outgoing data signals are converted into digital signals that are subsequently converted to outbound RF signals. Inbound RF signals are converted into incoming data signals and that may be provided to the monitor 18, the printer 24, and/or other character presentation device.

In addition, the handheld computing unit 12 may provide a WLAN transceiver for coupling to the WLAN router 28 to support WLAN RF communications 42 for the computing device 10. The WLAN communications 42 may be for accessing the internet 38 via modem 36, for accessing the entertainment server, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the computing device 10 (i.e., the handheld computing unit 12 and the extended computing unit 14) may use the WLAN communications 42 to retrieve and/or store music and/or video files on the entertainment server; and/or to access one or more of the entertainment components 34 and/or the entertainment receiver 32.

Figure 3:
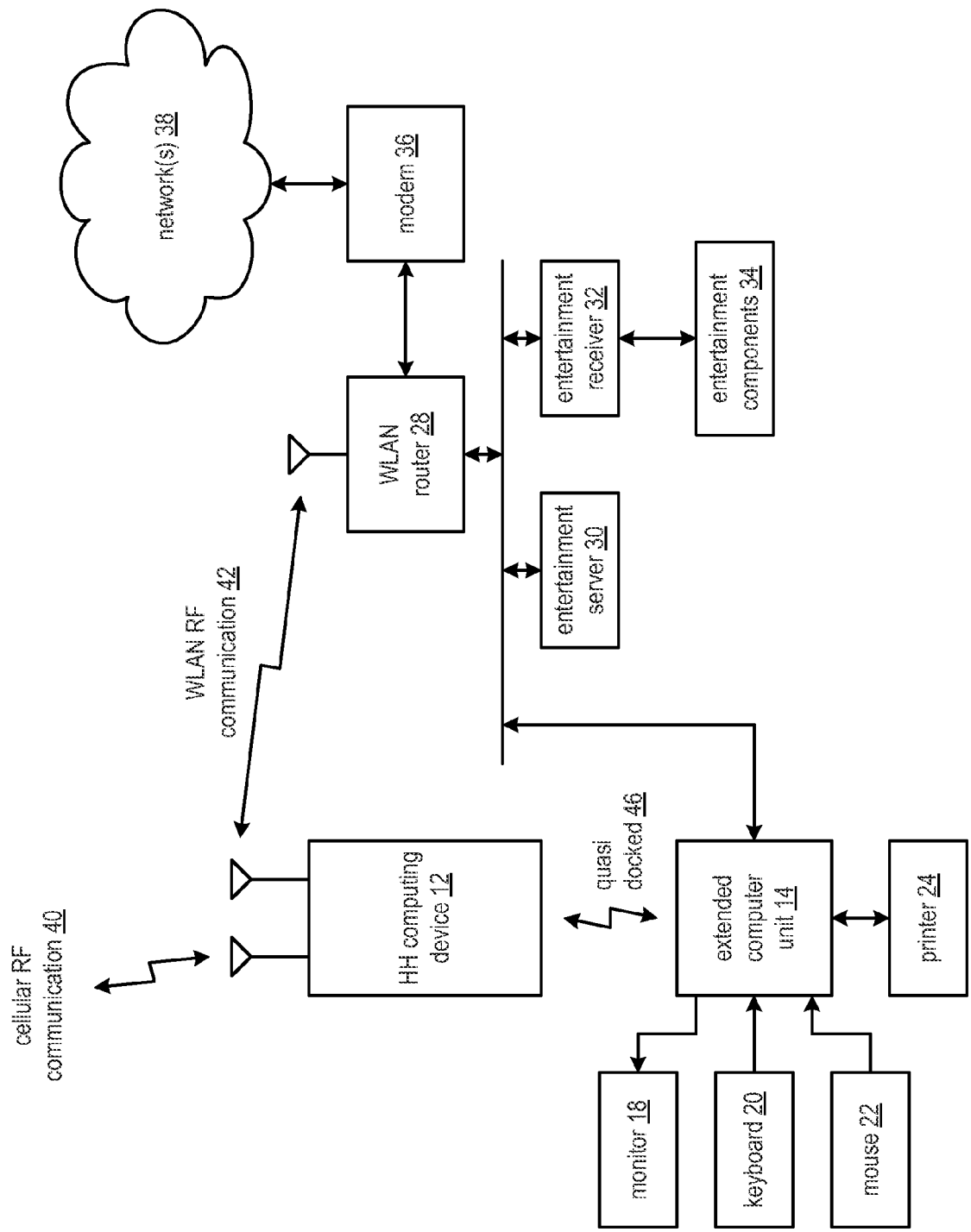
FIG. 3 is a schematic block diagram of an embodiment of a handheld computing unit quasi docked to an extended computing unit within a communication system in accordance with the present invention.

FIG. 3 is a schematic block diagram of an embodiment of a handheld computing unit 12 quasi docked to an extended computing unit 14 within a communication system. In this embodiment, the communication system may include one or more of a wireless local area network (WLAN) router 28, a modem 36 coupled to the internet 38, an entertainment server 30 (e.g., a server coupled to database of movies, music, video games, etc.), an entertainment receiver 32, entertainment components 34 (e.g., speaker system, television monitor and/or projector, DVD (digital video disc) player or newer versions thereof, VCR (video cassette recorder), satellite set top box, cable set top box, video game console, etc.), and a voice over internet protocol (VoIP) phone 26. As an alternative or in addition to the WLAN router 28, the system may include a local area network (LAN) router coupled to the extended computing unit 14.

As is also shown, the extended computing unit 14 is coupled to a monitor 18, a keyboard, a mouse 22, and a printer 24. The extended computing unit 14 may also be coupled to other devices (not shown) such as a trackball, touch screen, gaming devices (e.g., joystick, game pad, game controller, etc.), an image scanner, a webcam, a microphone, speakers, and/or a headset. In addition, the extended computing unit 14 may have a form factor similar to a personal computer and/or a laptop computer.

In this example, the handheld computing unit 12 is quasi docked 46 to the extended computer unit 14, where the handheld computing unit 12 functions as a stand-alone computer with limited resources (e.g., processing modules, user inputs/outputs, main memory, etc. of the handheld computing unit) and limited access to the memory of the extended computing unit 14. The quasi docking 46 of the handheld computing unit 12 to the extended computing unit 14 is provided by an RF communication, where an RF transceiver of the handheld computing unit 12 is communicating with an RF transceiver of the extended computing unit 14. Depending on the bit rate of the RF connection, the handheld computing unit can access files and/or applications stored in memory of the extended computing unit 14. In addition, the handheld computing unit 12 may direct the processing module of the extended computing unit 14 to perform a remote co-processing function, but the processing module of the handheld computing unit and the extended computing unit do not function as a multi-processing module as they do when in the extended mode.

As an alternative, the quasi extended mode may be achieved by the handheld computing unit 12 communicating with the extended computing unit via the WLAN communication 42 and the WLAN router 28. As yet another example, the quasi extended mode may be achieved via a data cellular RF communication 40 via the network(s) 38 to the extended computing unit 14.

In this mode, the handheld computing unit 12 may transceive cellular RF communications 40 (e.g., voice and/or data communications). Outgoing voice signals originate at a microphone of the handheld computing unit 12. The outgoing voice signals are converted into digital signals that are subsequently converted to outbound RF signals. Inbound RF signals are converted into incoming digital audio signals and that are provided to a speaker, or headphone jack, of the handheld computing unit 12.

Outgoing data signals originate at a keypad or touch screen of the handheld computing unit 12. The outgoing data signals are converted into digital signals that are subsequently converted to outbound RF signals. Inbound RF signals are converted into incoming data signals that are provided to the handheld display and/or other handheld character presentation device.

In addition, the handheld computing unit 12 may provide a WLAN transceiver for coupling to the WLAN router 28 to support WLAN RF communications 42 with the WLAN router 28. The WLAN communications 42 may be for accessing the internet 38 via modem 36, for accessing the entertainment server, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the handheld computing unit 12 may use the WLAN communications 42 to retrieve and/or store music and/or video files on the entertainment server; and/or to access one or more of the entertainment components 34 and/or the entertainment receiver 32.

Figure 4:
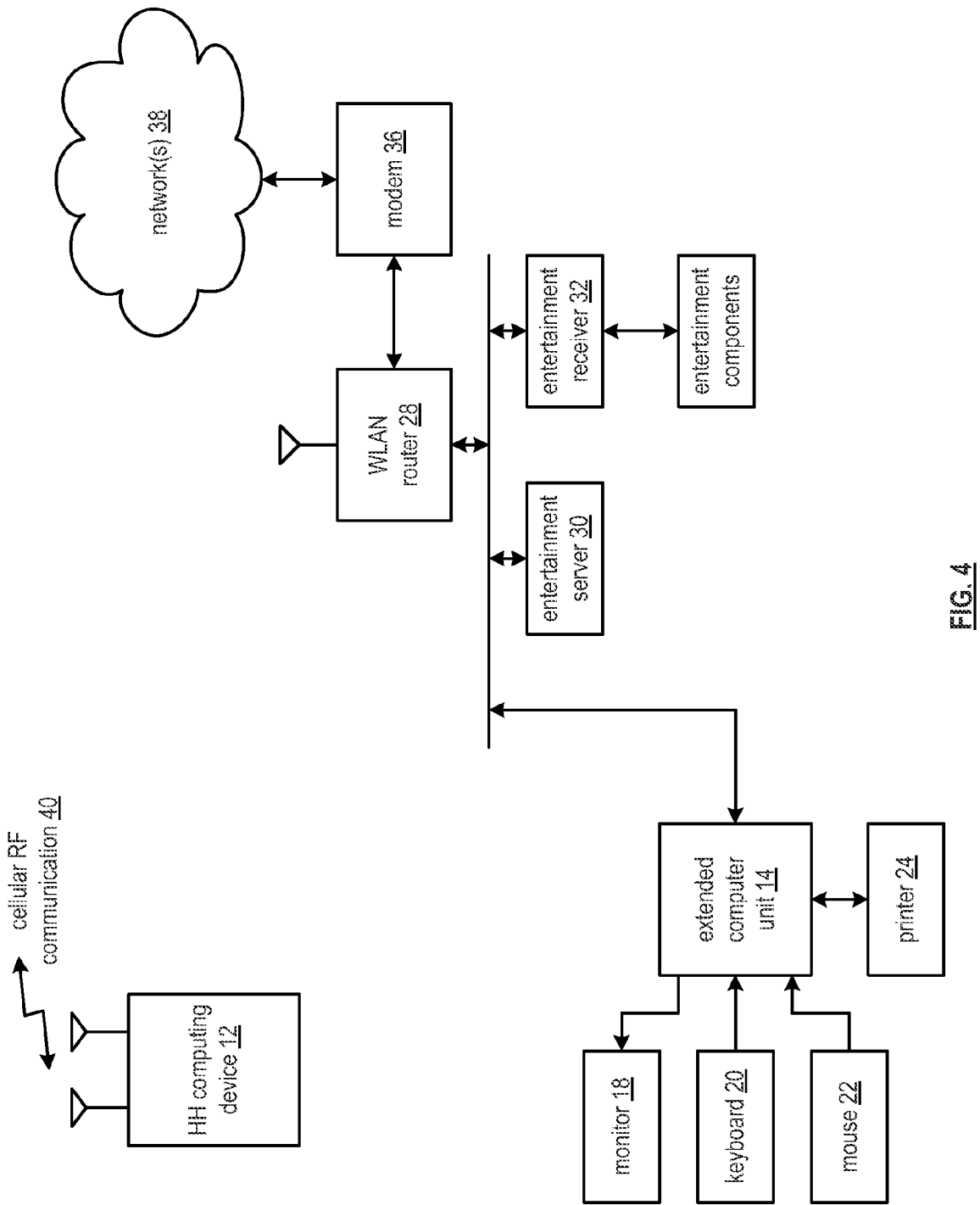
FIG. 4 is a schematic block diagram of an embodiment of a handheld computing unit in a remote mode with respect to an extended computing unit within a communication system in accordance with the present invention.

FIG. 4 is a schematic block diagram of an embodiment of a handheld computing unit 12 in a remote mode with respect to an extended computing unit 14. In this mode, the handheld computing unit 12 has no communications with the extended computing unit 14. As such, the extended computing unit 14 is disabled and the handheld computing unit 12 functions as a stand-alone computing device.

FIG. 5 is a schematic block diagram of another embodiment of a computing device 10 that includes a handheld computing unit 12 docked, or quasi-docked, with an extended computing unit 14. In this diagram, the computing device 10 includes computer level applications 39, computer level application programming interfaces (API) 33, a computer level operating system 27, and computer level hardware 21. The computer level applications 39 include system applications (e.g., input/output device drivers, peripheral device drivers, printer spoolers, video graphics, etc.) and user applications (e.g., database programs, word processing programs, spreadsheet programs, audio playback programs, video playback programs, etc.).

The hardware 21 portion of the computing device 10 includes core hardware 23 on the handheld (HH) computing unit 12 and hardware 25 of the EXT computing unit 14. As will be described in FIG. 7-17, the hardware of the HH computing unit 12 may include one or more of: a radio frequency (RF) section, a baseband processing module, a hard disk and/or flash memory, main memory, a processing module, RAM, ROM, clock circuitry, an audio IO interface, a video IO interface, a data IO interface, and may further include a memory controller. The hardware 25 of the EXT computing unit 14 may include one or more of: a hard disk and/or flash memory, main memory, a co-processing module, RAM, ROM, slave clock circuitry, an audio IO interface, a video IO interface, a data IO interface, and may further include a memory controller.

In this instance, the hardware of the HH computing unit 12 is the core hardware of the computing device 10 and the hardware of the EXT computing unit 14 provides an extension of the HH hardware 23. For example, the processing module of the HH computing unit 12 may use the processing module of the EXT computing unit 14 as a co-processor, as an auxiliary processor, as part of a multiple-processor core, or not use it at all. As another example, the HH computing unit 12 may use the main memory of the EXT computing unit 14 as an extension of its main memory, as an auxiliary main memory (e.g., use as a backup copy), as a second layer of cache (e.g., L1 or L2 cache), or not use it at all.

The operating system 27 includes a core operating system 29 stored in memory of the HH computing device 12 and an operating system extension 31 stored on the EXT computing unit 14. The operating system of the computing device 10 is discussed in detail with reference to FIGS. 20-36 of the parent application referenced above. In general, the core operating system 29 provides the primary operating system for the computing device 10 and the EXT operating system 31 augments the primary operating system for further functionality when the HH computing unit 12 is docked to the EXT computing unit 14.

The computer level API 33 includes APIs 35 that are stored on the HH computing unit 12 and APIs 37 that are stored on the EXT computing unit 14. Similarly, the computer level applications 39 include applications 41 that are stored on the HH computing unit 12 and applications 43 stored on the EXT computing unit 14. As described in the parent patent application, applications may reside on the handheld computing unit 12 (e.g., cellular telephone applications) or on the extended computing unit 14. The applications may be swapped therebetween such that, when the HH computing unit 12 is not docked to the EXT computing unit 14, the HH computing unit 12 can store the applications 39 of interest to the user of the HH computing device 12 in a mobile mode (i.e., not docked).

FIG. 6 is a schematic block diagram of another embodiment of a computing device 10 where the handheld computing unit 12 is not docked to an extended computing unit 14. In this instance, HH computing unit 12 functions as a stand-alone mobile device while the EXT computing unit 14 is substantially non-operational. As shown, the architecture of the HH computing unit 12 includes vertical functional coupling of the hardware 23, the operating system 29, the API 35, and the applications 41. As is also shown, the EXT computing unit 14 does not include vertical functional coupling since each of the blocks (e.g., hardware 25, operating system 31, API 37, and applications 43) are extensions of the corresponding blocks of the HH computing unit 12. In this manner, there is only one hardware core and one operating system for a computing device 10 that operates in a extended mode (e.g., FIG. 5) similarly to a personal computer and in a non-docked or mobile manner (e.g., FIG. 6) similarly to a cellular telephone with personal digital assistance capabilities, digital audio player capabilities, digital video player capabilities, handheld computing capabilities, and/or other mobile computing capabilities.

Figure 7:
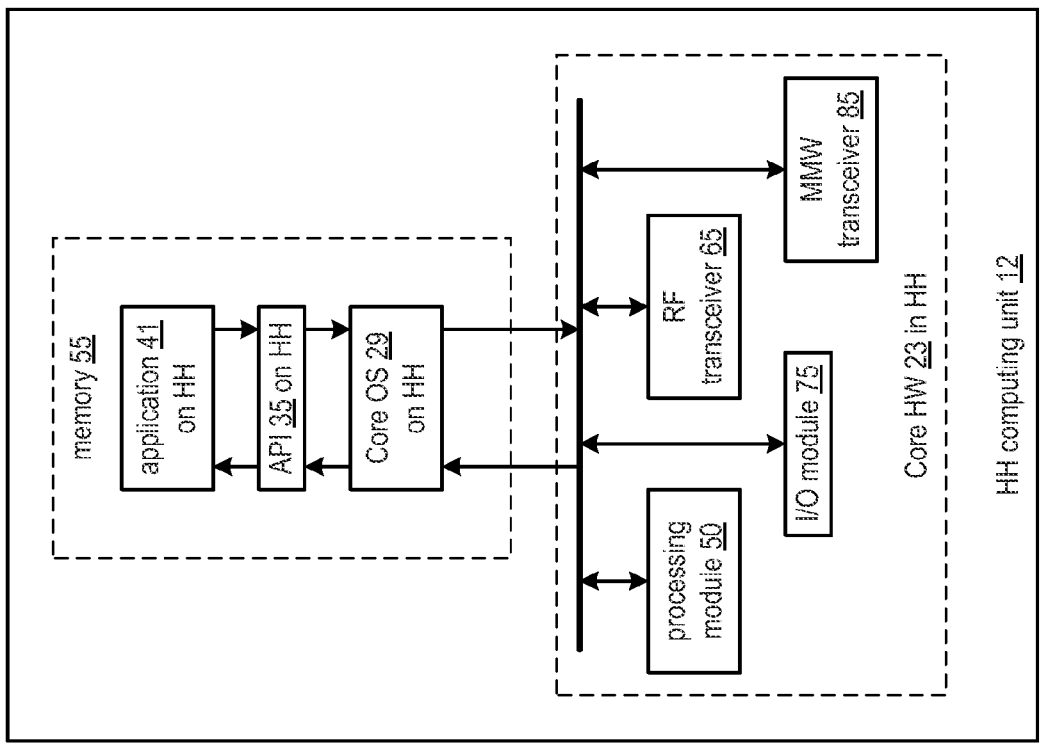
FIG. 7 is a schematic block diagram of an embodiment of a handheld computing unit in accordance with the present invention.

FIG. 7 is a schematic block diagram of an embodiment of a handheld computing unit 12 that includes the care hardware section 23, the core operating system 29, the application programming interface 35, and the application section 41. The hardware section 23 includes a processing module 50, an RF transceiver 65, an input/output (IO) module 75, and a millimeter wave (MMW) transceiver 85. Memory 55 stores the core operating system 29, the application programming interface 35, and the application section 41. In an embodiment, memory 55 includes system memory, hard disk and/or flash memory, random access memory, read only memory, and/or any other type of memory storage device. The IO module 75 includes one or more of a microphone interface, a speaker interface, a video input, a video output, a data input, a data output, etc.

The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/ or operational instructions corresponding to at least some of the steps and/or functions illustrated in FIGS. 1-19.

For RF communications, the processing module converts outbound data (e.g., voice, text, audio, video, graphics, etc.) into outbound symbol stream in accordance with one or more wireless communication standards. Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

A transmitter section of the RF transceiver 65 converts the outbound symbol stream into an outbound RF signal that has a carrier frequency within a given frequency band (e.g., 900 MHz, 1800 MHz, 1900 MHz, 2.4 GHz, 5 GHz, etc.). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., +/−Δθ [phase shift] and/or θ(t) [phase modulation]) that adjusts the phase of the oscillation to produce a phase adjusted RF signal, which is transmitted as the outbound RF signal. In another embodiment, the outbound symbol stream includes amplitude information (e.g., A(t) [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., +/−Δf [frequency shift] and/or f(t) [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., +/−ΔA [amplitude shift] and/or A(t) [amplitude modulation) that adjusts the amplitude of the oscillation to produce the outbound RF signal.

A receiver section of the RF transceiver 65 amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signal includes amplitude information (e.g., +/−ΔA [amplitude shift] and/or A(t) [amplitude modulation]). To recover the amplitude information, the receiver section includes an amplitude detector such as an envelope detector, a low pass filter, etc.

The processing module 50 converts the inbound symbol stream into inbound data (e.g., voice, text, audio, video, graphics, etc.) in accordance with one or more wireless communication standards. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

For MMW communications, the processing module converts outbound data (e.g., voice, text, audio, video, graphics, etc.) into outbound symbol stream in accordance with one or more wireless communication standards. Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

A transmitter section of the MMW transceiver 85 converts the outbound symbol stream into an outbound RF signal that has a carrier frequency within a given frequency band (e.g., 29 GHz, 57-66 GHz, etc.). In an embodiment, this may be done by mixing the outbound symbol stream with a local oscillation to produce an up-converted signal. One or more power amplifiers and/or power amplifier drivers amplifies the up-converted signal, which may be MMW bandpass filtered, to produce the outbound MMW signal. In another embodiment, the transmitter section includes an oscillator that produces an oscillation. The outbound symbol stream provides phase information (e.g., +/−Δθ [phase shift] and/or θ(t) [phase modulation]) that adjusts the phase of the oscillation to produce a phase adjusted MMW signal, which is transmitted as the outbound MMW signal. In another embodiment, the outbound symbol stream includes amplitude information (e.g., A(t) [amplitude modulation]), which is used to adjust the amplitude of the phase adjusted MMW signal to produce the outbound MMW signal.

In yet another embodiment, the transmitter section includes an oscillator that produces an oscillation. The outbound symbol provides frequency information (e.g., +/−γf [frequency shift] and/or f(t) [frequency modulation]) that adjusts the frequency of the oscillation to produce a frequency adjusted MMW signal, which is transmitted as the outbound MMW signal. In another embodiment, the outbound symbol stream includes amplitude information, which is used to adjust the amplitude of the frequency adjusted MMW signal to produce the outbound MMW signal. In a further embodiment, the transmitter section includes an oscillator that produces an oscillation. The outbound symbol provides amplitude information (e.g., +/−ΔA [amplitude shift] and/or A(t) [amplitude modulation) that adjusts the amplitude of the oscillation to produce the outbound MMW signal.

A receiver section of the MMW transceiver 85 amplifies an inbound MMW signal to produce an amplified inbound RF signal. The receiver section may then mix in-phase (I) and quadrature (Q) components of the amplified inbound MMW signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound MMW signal includes amplitude information (e.g., +/−ΔA [amplitude shift] and/or A(t) [amplitude modulation]). To recover the amplitude information, the receiver section includes an amplitude detector such as an envelope detector, a low pass filter, etc.

The processing module 50 converts the inbound symbol stream into inbound data (e.g., voice, text, audio, video, graphics, etc.) in accordance with one or more wireless communication standards. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

Figure 8:
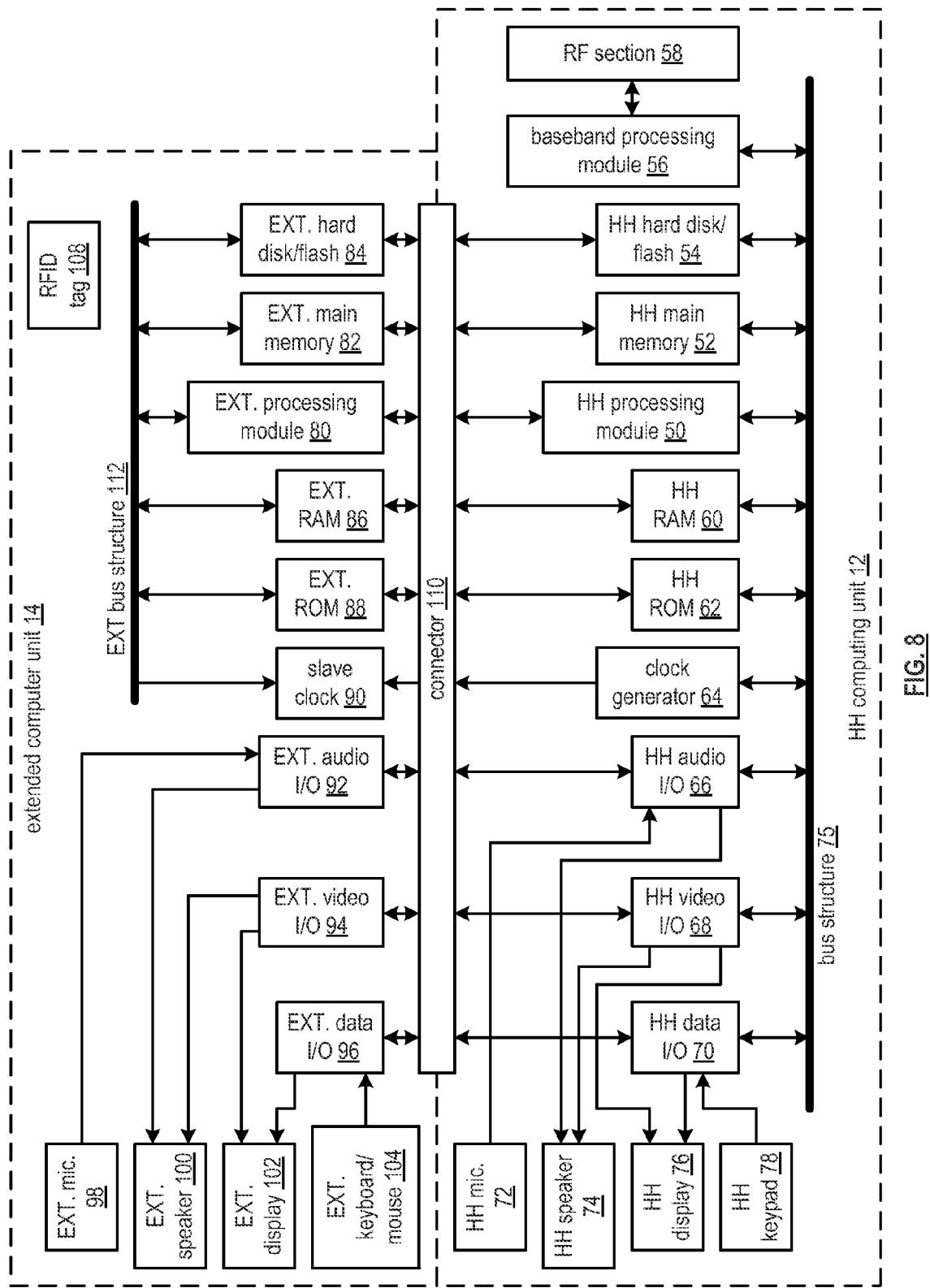
FIG. 8 is a schematic block diagram of another embodiment of a handheld computing unit coupled to an extended computing unit in accordance with the present invention.

FIG. 8 is a schematic block diagram of an embodiment of a handheld computing unit 12 docked to an extended computing unit 14. The handheld computing unit 12 includes a handheld processing module 50, handheld main memory 52, handheld hard disk/flash memory 54, a baseband processing module 56, a radio frequency (RF) section 58, handheld random access memory (RAM) 60, handheld read only memory (ROM) 62, a clock generator circuit 64, handheld input/output (I/O) interfaces (e.g., handheld audio I/O interface 66, handheld video and/or graphics interface 68, and handheld data I/O interface 70), and handheld I/O components (e.g., handheld microphone 72, handheld speaker 74, handheld display 76, and a handheld keypad and/or touch screen 78), a handheld bus structure 75, and a handheld connection structure 110.

The extended computing unit 14 includes an extended processing module 80, extended main memory 82, extended hard disk/flash memory 84, extended random access memory (RAM) 86, extended read only memory (ROM) 88, a slave clock circuit 90, extended input/output (I/O) interfaces (e.g., extended audio I/O interface 92, extended video and/or graphics interface 94, and an extended data I/O interface 96), and extended I/O components (e.g., extended microphone 98, extended speaker 100, extended display 102—which may be monitor 18 and/or printer 24—, and an extended keyboard/mouse 104, which may be keyboard 20 and mouse 22), an extended connection structure 110, an extended bus structure 112, and a radio frequency identification (RFID) tag 108.

Within the handheld computing unit 12, the processing module 50 and the baseband processing module 56 may be separate processing modules or the same processing module. Such a processing module may be a single processing device or a plurality of processing devices, where a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-19.

Also within the handheld computing unit 12, the handheld main memory 52 includes one or more RAM integrated circuits (IC) and/or boards. The RAM may be static RAM (SRAM) and/or dynamic RAM (DRAM). The handheld hard disk/flash memory 54 may be one or more of a hard disk, a floppy disk, an optical disk, NOR flash memory, NAND flash memory, and/or any other type of non-volatile memory. The clock generator circuit 64 may be one or more of: a phase locked loop, a crystal oscillator circuit, a fractional-N synthesizer, and/or a resonator circuit-amplifier circuit, where the resonator may be a quartz piezo-electric oscillator, a tank circuit, or a resistor-capacitor circuit. Regardless of the implementation of the clock generator circuit 64, it generates a master clock signal that is provided to the slave clock circuit 90 and generates the clock signals for the handheld computing unit 12. Such clock signals include, but are not limited to, a bus clock, a read/write clock, a processing module clock, a local oscillation, and an I/O clock.

The handheld ROM 62 stores the basic input/output system (BIOS) program for the computing device 10 (i.e., the handheld computing unit 12 and the extended computing unit 14). The ROM 62 may be one or more of an electronically erasable programmable ROM (EEPROM), a programmable ROM (PROM), and/or a flash ROM.

As used herein, an interface includes hardware and/or software for a device coupled thereto to access the bus of the handheld computing unit and/or of the extended computing unit. For example, the interface software may include a driver associated with the device and the hardware may include a signal conversion circuit, a level shifter, etc. Within the handheld computing unit, the handheld audio I/O interface 66 may include an audio codec, a volume control circuit, and/or a microphone bias and/or amplifier circuit to couple the handheld (HH) microphone 72 and/or the HH speaker 74 to the HH bus structure 75. The HH video I/O interface 68 may include a video codec, a graphics engine, a display driver, etc. to couple the HH display to the HH bus structure 75. The HH data I/O interface 70 may include the graphics engine, a display driver, a keypad driver, a touch screen driver, etc. to coupled the HH display 76 and/or the HH keypad 78 to the HH bus structure 75.

Within the extended computing unit 14, the extended (EXT) processing module 80 may be a single processing device or a plurality of processing devices, where a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-47.

Also within the extended computing unit 14, the EXT main memory 86 includes one or more RAM integrated circuits (IC) and/or boards. The RAM may be static RAM (SRAM) and/or dynamic RAM (DRAM). Note that the EXT main memory 86 and the EXT RAM 86 may be omitted if the handheld computing unit contains a sufficient amount of main memory. The EXT hard disk/flash memory 84 may be one or more of a hard disk, a floppy disk, at tape drive, an optical disk, NOR flash memory, NAND flash memory, and/or any other type of non-volatile memory. The slave clock circuit 90 may be a phase locked loop (PLL), clock divider, and/or clock multiplier that receives the master clock signal and produces therefrom the clock signals for the extended computing unit 14. Such clock signals include, but are not limited to, a bus clock, a read/write clock, a processing module clock, and an I/O clock.

The EXT ROM 88 may be one or more of an electronically erasable programmable ROM (EEPROM), a programmable ROM (PROM), and/or a flash ROM. Note that the EXT ROM 88 may be omitted if the HH ROM 62 is of sufficient size to accommodate the BIOS program and other system data that is stored in non-volatile memory.

The EXT audio I/O interface 92 may include a sound card and corresponding driver to couple the EXT microphone 98 and/or the EXT speaker 100 to the HH and/or EXT bus structure 75 and/or 112. The EXT video I/O interface 94 may include a video codec, a graphics card, a graphics control unit, a display driver, etc. to couple the EXT display 102 (e.g., monitor 18) to the HH and/or EXT bus structure 75 and/or 112. The EXT data I/O interface 98 may include the graphics card, the graphics control unit, a display driver, a keyboard and mouse driver(s), a touch screen driver, etc. to coupled the EXT display 104 and/or the EXT keyboard/mouse 104 to the HH and/or EXT bus structure 75 and/or 112.

The RFID tag 108 provides an RF communication link to the handheld computing unit 12 when the extended computing unit 14 is disabled. The RFID tag 108 may be implemented as disclosed in co-pending patent application entitled POWER GENERATING CIRCUIT, having a Ser. No. 11/394,808, and a filing date of Mar. 31, 2006.

When the computing device 10 is active in a wireless transmission, the baseband processing module 56 and the RF section 58 are active. For example, for cellular voice communications, the baseband processing module 56 converts an outbound voice signal into an outbound voice symbol stream in accordance with one or more existing wireless communication standards, new wireless communication standards, modifications thereof, and/or extensions thereof (e.g., GSM, AMPS, digital AMPS, CDMA, etc.). The baseband processing module 56 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal into the outbound voice symbol stream. Depending on the desired formatting of the outbound voice symbol stream, the baseband processing module 56 may generate the outbound voice symbol stream as Cartesian coordinates (e.g., having an in-phase signal component and a quadrature signal component to represent a symbol), as Polar coordinates (e.g., having a phase component and an amplitude component to represent a symbol), or as hybrid coordinates as disclosed in co-pending patent application entitled HYBRID RADIO FREQUENCY TRANSMITTER, having a filing date of Mar. 24, 2006, and an application Ser. No. 11/388,822, and co-pending patent application entitled PROGRAMMABLE HYBRID TRANSMITTER, having a filing date of Jul. 26, 2006, and an application Ser. No. 11/494,682.

The RF section 58 converts the outbound voice symbol stream into an outbound RF voice signal in accordance with the one or more existing wireless communication standards, new wireless communication standards, modifications thereof, and/or extensions thereof (e.g., GSM, AMPS, digital AMPS, CDMA, etc.). In one embodiment, the RF section 58 receives the outbound voice symbol stream as Cartesian coordinates. In this embodiment, the RF section 58 mixes the in-phase components of the outbound voice symbol stream with an in-phase local oscillation to produce a first mixed signal and mixes the quadrature components of the outbound voice symbol stream to produce a second mixed signal. The RF section 58 combines the first and second mixed signals to produce an up-converted voice signal. The RF section 58 then amplifies the up-converted voice signal to produce the outbound RF voice signal, which it provides to an antenna section. Note that further power amplification may occur between the output of the RF section 58 and the input of the antenna section.

In other embodiments, the RF section 58 receives the outbound voice symbol stream as Polar or hybrid coordinates. In these embodiments, the RF section 58 modulates a local oscillator based on phase information of the outbound voice symbol stream to produce a phase modulated RF signal. The RF section 58 then amplifies the phase modulated RF signal in accordance with amplitude information of the outbound voice symbol stream to produce the outbound RF voice signal. Alternatively, the RF section 58 may amplify the phase modulated RF signal in accordance with a power level setting to produce the outbound RF voice signal.

For incoming voice signals, the RF section 58 receives an inbound RF voice signal via the antenna section. The RF section 58 converts the inbound RF voice signal into an inbound voice symbol stream. In an embodiment, the RF section 58 extracts Cartesian coordinates from the inbound RF voice signal to produce the inbound voice symbol stream. In another embodiment, the RF section 58 extracts Polar coordinates from the inbound RF voice signal to produce the inbound voice symbol stream. In yet another embodiment, the RF section 58 extracts hybrid coordinates from the inbound RF voice signal to produce the inbound voice symbol stream.

The baseband processing module 56 converts the inbound voice symbol stream into an inbound voice signal. The baseband processing module 56 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound voice symbol stream into the inbound voice signal, which is placed on the bus structure 75.

The baseband processing module 56 and the RF section function similarly for processing data communications and for processing WLAN communications. For data communications, the baseband processing module 56 and the RF section function in accordance with one or more cellular data protocols such as, but not limited to, Enhanced Data rates for GSM Evolution (EDGE), General Packet Radio Service (GPRS), high-speed downlink packet access (HSDPA), high-speed uplink packet access (HSUPA), newer version thereof, and/or replacements thereof. For WLAN communications, the baseband processing module 56 and the RF section 58 function in accordance with one or more wireless communication protocols such as, but not limited to, IEEE 802.11(a), (b), (g), (n), etc., Bluetooth, ZigBee, RFID, etc.

When the computing device 10 is executing one or more user applications (e.g., word processing, spreadsheet processing, presentation processing, email, web browsing, database, calendar, video games, digital audio playback, digital video playback, digital audio record, digital video record, video games, contact management program, notes, web favorites, money management program, etc.), the HH processing module 50 and the EXT processing module 80 function as a multiprocessing module and the HH and EXT main memories 52 and 82 function as combined main memory. In addition, the HH hard disk/flash memory 54 and the EXT hard disk/flash memory 84 function as a combined hard disk/flash memory.

For instance, the multiprocessing module provides multiprocessing via the HH and EXT processing modules 50 and 80. In this configuration, the processing modules 50 and 80 may share tasks and/or execute multiple concurrent software processes. Further, the processing modules 50 and 80 may be equal; one may be reserved for one or more special purposes; may be tightly coupled; may be loosely coupled; etc. For example, at the operating system level, the HH processing module 50 may be designated to respond to all interrupts, traps, and/or services calls and the invoke the EXT processing module 80 as needed. As another example, at the user level, the processing modules may function in a symmetrical multiprocessing mode, in an asymmetrical multiprocessing mode, in a non-uniform memory access multiprocessing mode, and/or in a clustered multiprocessing mode.

With respect to instruction and data streams, the processing modules 50 and 80 may execute a single sequence of instructions in multiple contexts (single-instruction, multiple-data or SIMD), multiple sequences of instructions in a single context (multiple-instruction, single-data or MISD), or multiple sequences of instructions in multiple contexts (multiple-instruction, multiple-data or MIMD).

The computing device 10 incorporates a virtual memory technique, overlays, and/or swapping to utilize the combined main memories and hard disk/flash memories for one or more user applications. In an embodiment, the virtual memory is divided the virtual address space into pages (e.g., a 4K-Byte block), where one or more page tables (e.g., one for the computing device, one for each running user application, etc.) translates the virtual address into a physical address. Note that the memory controller manages accesses to the one or more page tables to facilitate the fetching of data and/or instructions from physical memory. If a page table indicates that a page is not currently in memory, the memory controller and/or one of the processing modules 50 and/or 80 raise a page fault interrupt.

A paging supervisor of the operating system receives the page fault interrupt and, in response, searches for the desired page containing the required virtual address. Once found, the paging supervisor reads the page into main memory and updates the appropriate page table. If there is insufficient room the main memory, the paging supervisor saves an area of the main memory to the HH or EXT hard disk/flash memory and update the corresponding page table. The cleared area of main memory is then used for the new page.

With respect to user I/O devices, the HH microphone 72, the HH speaker 74, the HH display 76 and the HH keypad 78 may be disabled while the handheld computing unit is docked. In this mode, the EXT microphone 98, the EXT speaker 100, the EXT display 102, and the EXT keyboard/mouse 104 are active to provide the user interfaces to the computing device 10. Note that for a cellular voice telephone call, the inbound and outbound voice signals may be provided to/from the EXT microphone 98 and the speaker 100, an EXT headset (not shown), or the VoIP phone 46.

Figure 9:
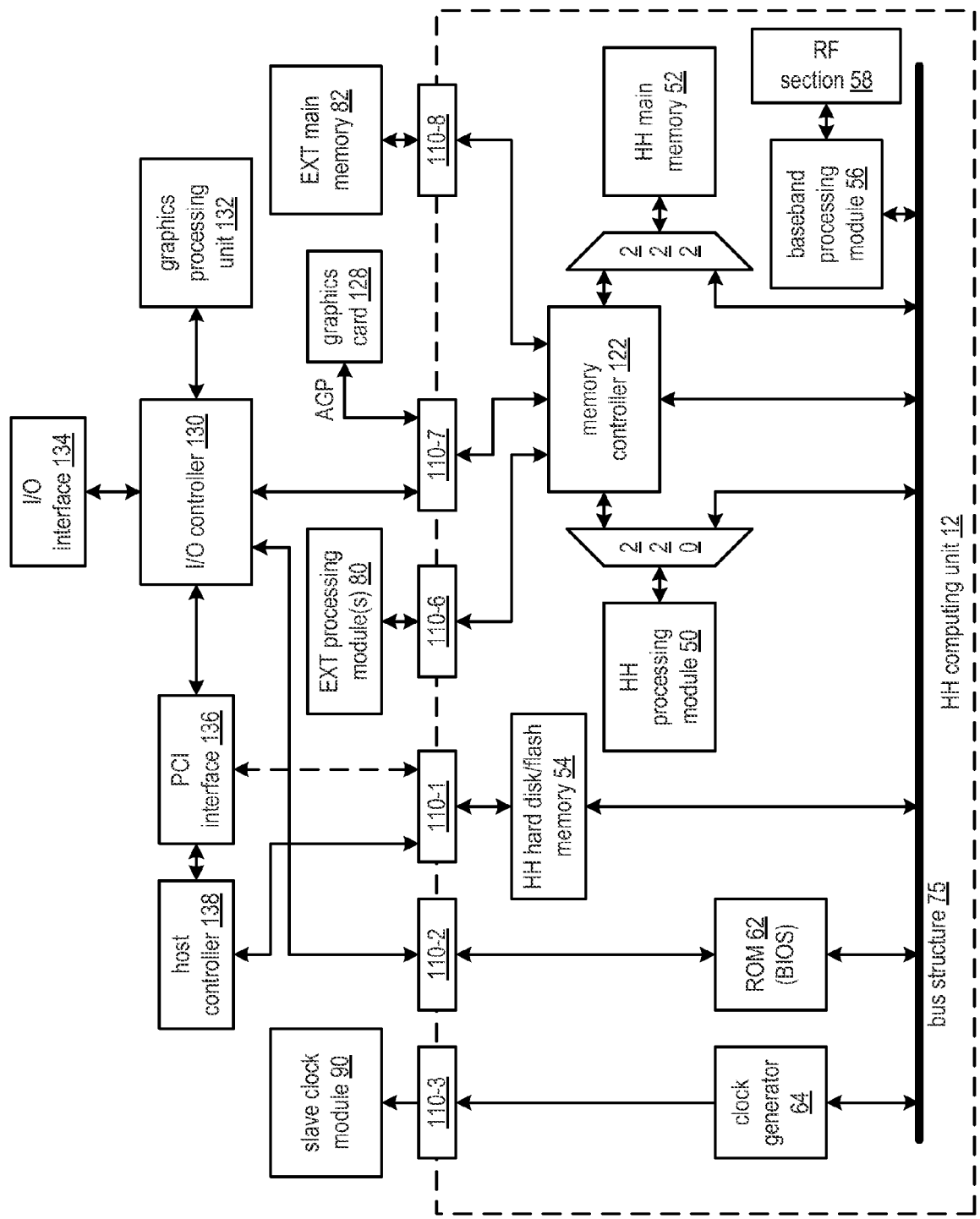
FIG. 9 is a schematic block diagram of another embodiment of a handheld computing unit coupled to an extended computing unit in accordance with the present invention.

FIG. 9 is a schematic block diagram of another embodiment of core components of core components of a handheld computing unit 12 docked to an extended computing unit 14. The core components of the handheld computing unit 12 include the HH processing module 50, the HH main memory 52, the HH hard disk/flash memory 54, the baseband processing module 56, the RF section 58, the ROM 62, the handheld connection structure 110A, which may be individual connections 110-1 through 110-8, the memory controller 122, and optional demultiplexers 220 and 222. The core components of the extended computing unit 14 include the corresponding connection structure 110B, one or more EXT processing modules 80, the EXT main memory 82, the slave clock module 90, the graphics card 128 and/or the graphics processing unit 132, the I/O controller 130, the I/O interface 134, the PCI interface 136, and the host controller 138.

With handheld computing unit 12 docked to the extended computing unit 14, the core components of units 12 and 14 function as a single computing device 10. As such, when the computing device 10 is enabled, the BIOS stored on the HH ROM 62 is executed to boot up the computing device. After initializing the operating system, which will described in greater detail with reference to FIGS. 19-22 and 27-36, the computing device 10 is ready to execute a user application.

In an embodiment, the memory controller 122 is within the handheld computing unit 12 and is coupled to the I/O controller 130, the graphics card 128, the EXT processing module 80, and the EXT main memory via the connector structure 110-6 through 110-8. When connected, the memory controller 122 coordinates the reading data from and writing data to the HH main memory 52 and the EXT main memory 82, by the processing modules 50 and 80, by the user I/O devices coupled directly or indirectly to the I/O controller 130, by the graphics card 128, and/or for data transfers with the HH and/or the EXT hard disk/flash memory 54 and/or 84.

If the demultiplexers 220 and 222 are included, the memory controller 122 is coupled to the HH processing module 50 via demultiplexer 220 and is coupled to the HH main memory 52 via demultiplexer 222 when the handheld computing unit 12 is in the extended mode. When the handheld computing unit 12 is in the remote mode, the memory controller 122 may be deactivated such that the demultiplexers 220 and 222 couple the HH processing module 50 and the HH main memory 52 to the HH bus structure 75. If the demultiplexers 220 and 222 are not included, the memory controller 122 is on in both the docked and remote modes to coordinate reading from and writing to the HH main memory 52.

Within the extended computing unit, the EXT processing module 80, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the I/O controller 130, the I/O interface 134, the PCI interface 136, and the host controller 138 may be implemented on the same integrated circuit.

Figure 10:
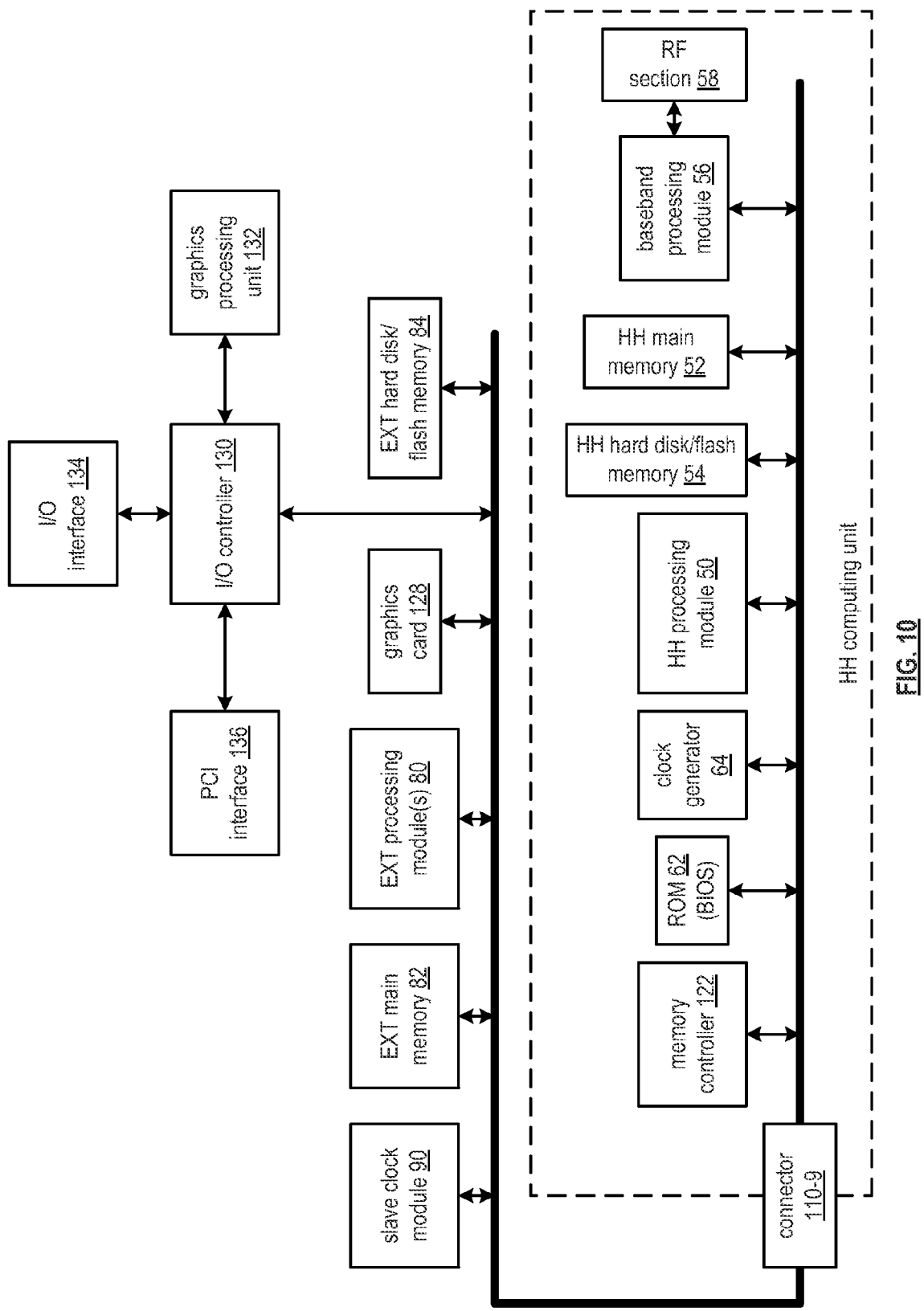
FIG. 10 is a schematic block diagram of another embodiment of a handheld computing unit coupled to an extended computing unit in accordance with the present invention.

FIG. 10 is a schematic block diagram of another embodiment of core components of a handheld computing unit 12 docked to an extended computing unit 14. The core components of the handheld computing unit 12 include the HH processing module 50, the HH main memory 52, the HH hard disk/flash memory 54, the baseband processing module 56, the RF section 58, the ROM 62, the handheld connection structure 110-9A, and the memory controller 122. The core components of the extended computing unit 14 include the corresponding connection structure 110-9B, one or more EXT processing modules 80, the EXT main memory 82, the slave clock module 90, the graphics card 128 and/or the graphics processing unit 132, the I/O controller 130, the I/O interface 134, the PCI interface 136, and the host controller 138.

With handheld computing unit 12 docked to the extended computing unit 14, the core components of units 12 and 14 function as a single computing device 10. As such, when the computing device 10 is enabled, the BIOS stored on the HH ROM 62 is executed to boot up the computing device. After initializing the operating system, which will described in greater detail with reference to FIGS. 19-22 and 27-36, the computing device 10 is ready to execute a user application.

In an embodiment, the memory controller 122 is within the handheld computing unit 12 and is coupled to the I/O controller 130, the graphics card 128, the EXT processing module 80, and the EXT main memory via the connector structure 110-9. When connected, the memory controller 122 coordinates the reading data from and writing data to the HH main memory 52 and the EXT main memory 82, by the processing modules 50 and 80, by the user I/O devices coupled directly or indirectly to the I/O controller 130, by the graphics card 128, and/or for data transfers with the HH and/or the EXT hard disk/flash memory 54 and/or 84.

Within the extended computing unit, the EXT processing module 80, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the I/O controller 130, the I/O interface 134, the PCI interface 136, and the host controller 138 may be implemented on the same integrated circuit.

Figure 11:
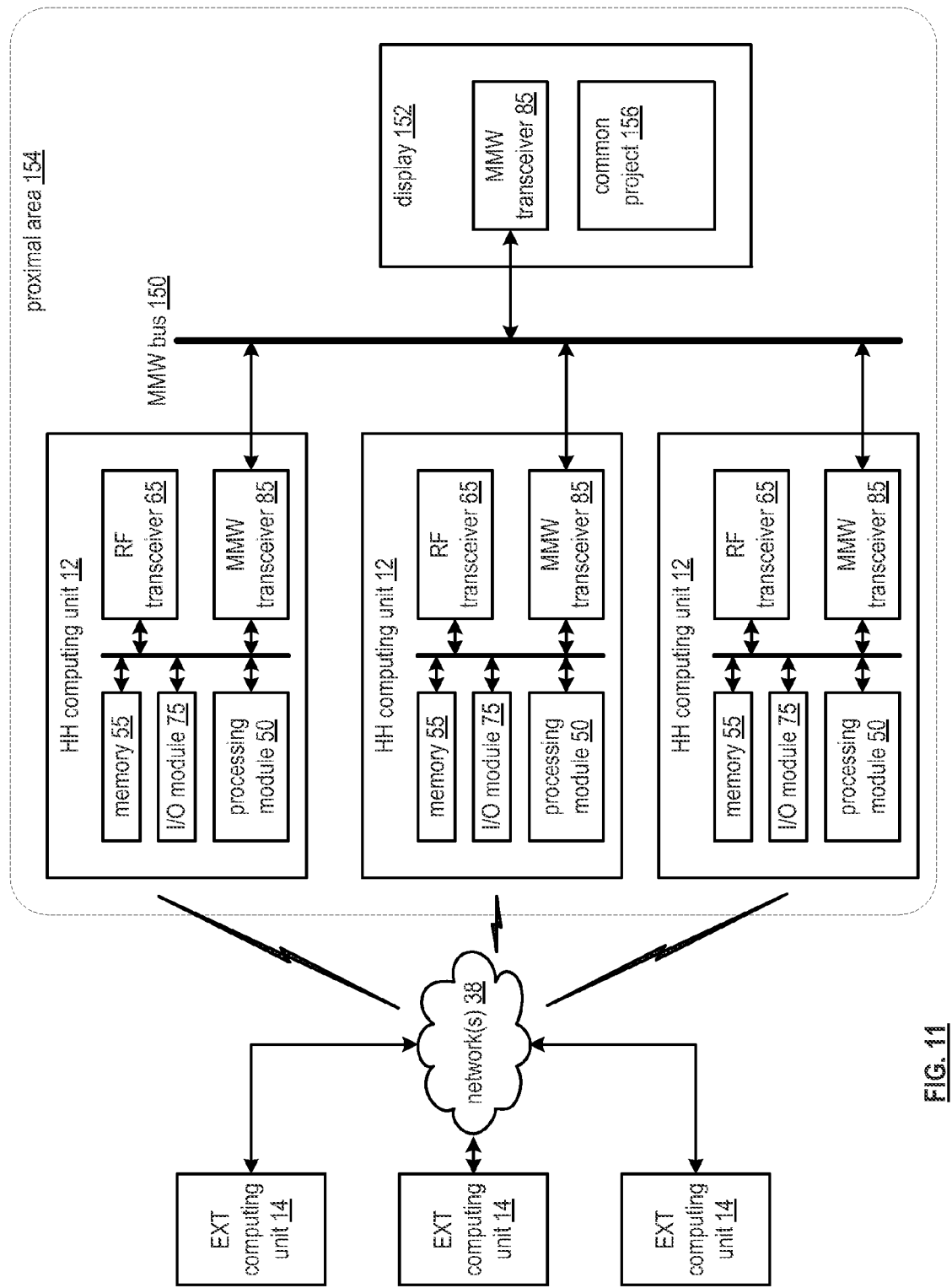
FIG. 11 is a schematic block diagram of an embodiment of a plurality of handheld computing units coupled in a wireless network in accordance with the present invention.

FIG. 11 is a schematic block diagram of an embodiment of a plurality of handheld computing units coupled in a wireless network. In this example, an ad hoc wireless network is established between three handheld computing units 12 that are in a proximal area 154 (e.g., in a room, office, etc.). The ad hoc wireless network may include other devices (e.g., a display or projector 152, a printer, a server, a personal computer, etc.) that include a MMW transceiver 85. The purposes for creating the ad hoc wireless network are many including, but not limited to, sharing data, collectively working on a common project 156, sharing hardware and/or software resources, and sharing tasks.

As shown, the handheld computing units 12 and the display 152 utilize the MMW transceivers 85 to establish a MMW bus 150. The MMW bus 150 may include one or more channels to support data transmissions, address transmissions, and/or control data transmissions. In general, the MMW bus 150 may be established and maintained as described in co-pending patent application entitled SHARED RF BUS STRUCTURE, having a filing date of Jan. 31, 2007, and a Ser. No. 11/700,517.

In addition to communicating via the ad hoc wireless network, the handheld computing units 12 may communication with their respective extended computing units 14 via the network(s) 38. In this manner, data may be retrieved from the respective extended computing unit 14 and shared with the other handheld computing units via the wireless network.

In an example of operation, the handheld computing units 12 may be in a network mode, an extended mode, a standalone mode, and/or a combination thereof. For example, the handheld computing units 12 may only be in a network mode (i.e., not accessing their extended computing units and only performing shared functions via the wireless network); may be in a combined network mode and extended mode (i.e., accessing their extended computing units and performing shared functions via the wireless network); may be in a combined network mode and standalone mode (i.e., not accessing their extended computing units, performing shared functions via the wireless network, and performing standalone functions); or may be in the standalone mode.

When a handheld computing unit is in the extended mode, its hardware section (e.g., one or more of the processing module 50, the RF transceiver 65, the IO module 75) is operably coupled to the hardware section of its extended computing unit 14. In addition, the handheld computing unit's operating system section (which is stored in memory 55) is operably coupled to the operating system section of its extended computing unit and the handheld computing unit's application section is operably coupled to an application section of its extended computing unit. An example of this mode was discussed with reference to FIG. 5.

When the handheld computing unit is in a network mode, its hardware section (e.g., one or more of the processing module 50, the RF transceiver 65, the IO module 75) is operably coupled to the hardware section of one or more of the other handheld computing unit 12. For example, the processing modules 50 of two of the handheld computing units may be operably coupled together via the MMW bus 150 to provide a multiple processor structure. As another example, the processing modules 50 of two or more of the handheld computing units may be coupled together via the MMW bus 150 to provide co-processing for one another. As yet another example, one processing module 50 may be coupled to one or more of the other handheld computing units to provide the processing module functionality for the other handheld computing unit such that the processing module of the other handheld computing is in inactive or in a reduced utilization mode.

As a further extension of the network mode, the operating system section of a handheld computing unit may be operably coupled to an operating system section of one or more of the other handheld computing units and the application section of the handheld computing unit may be operably coupled to an application section of one or more of the other handheld computing units. In this manner, the handheld computing units can share user applications, system level applications, and/or operating system functions.

When the handheld computing unit is in a standalone mode, its hardware section is operably coupled to perform a standalone hardware function, its operating system section is operably coupled to perform a standalone operating system function, and its application section is operably coupled to perform a standalone application function. For example, a standalone function may be to execute a user application, provide a graphical user interface, facilitate a cellular telephone call, facilitate a text message, capture a digital image, etc.

Figure 12:
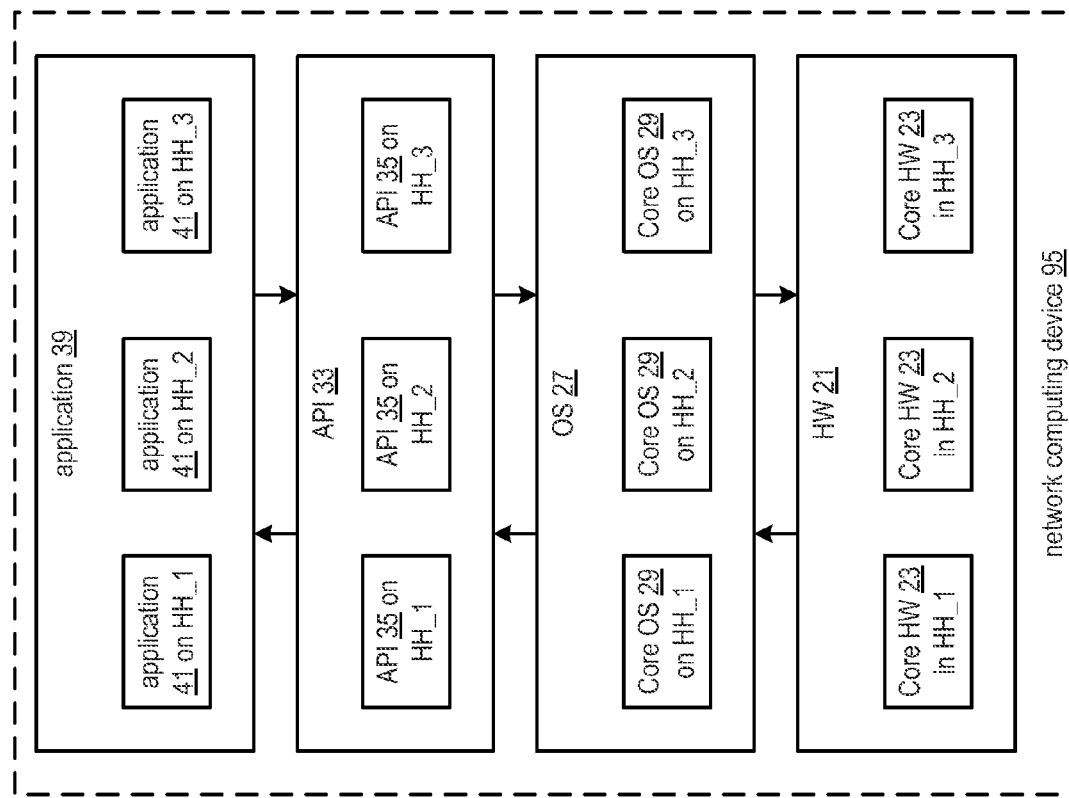
FIG. 12 is a schematic block diagram of an embodiment of a networked computing device that includes a plurality of handheld computing units in accordance with the present invention.

FIG. 12 is a schematic block diagram of an embodiment of a networked computing device 95 that includes a plurality of handheld computing units. In this embodiment, the three handheld computing units 12 form essentially one new device; a network computing device 95. The network computing device 95 includes a hardware section 21, an operating system section 27, an application programming interface (API) section 33, and an application section 39. Each section 21, 27, 33 and 35 includes one or more elements or features of each of the corresponding sections of the handheld computing units 12.

As an example, the hardware section 21 of the network computing device 95 includes one or more components (e.g., processing module 50, RF transceiver, IO module, etc.) of the hardware section of one or more of the handheld computing units. From the perspective of the network computing unit 95, the hardware resources are viewed as a single collection of resources to be used for performing networked functions (e.g., sharing of tasks, sharing of applications, etc.) regardless of where the hardware physically resides. The operating system and the applications are viewed and used in a similar manner.

Figure 13:
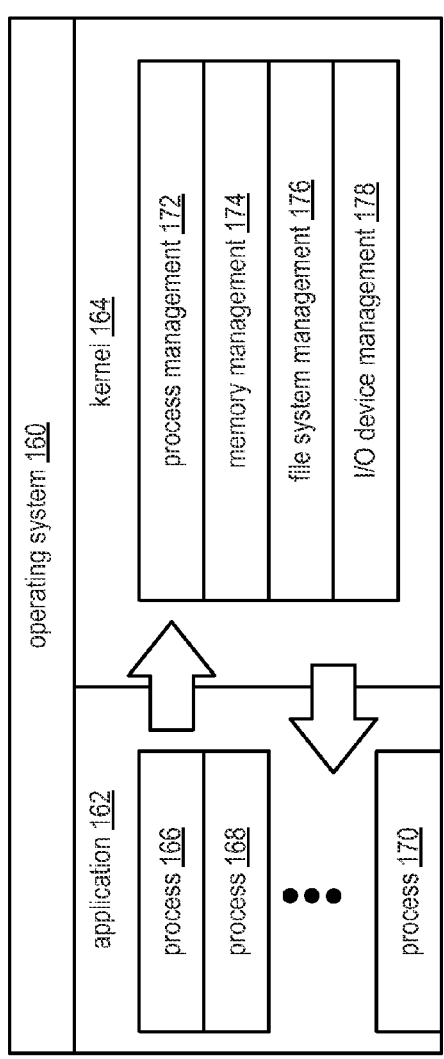
FIG. 13 is a diagram of an embodiment of an operating system in accordance with the present invention.

FIG. 13 is a diagram of an embodiment of an operating system 160 of a handheld computing unit 12 that includes an application section 162 and a kernel section 164. The application section 162 includes a plurality of processes 166-170, which correspond to one or more running user applications. The kernel section 174 includes one or more processing management kernels 172, one or more memory management kernels 174, one or more file system management kernels 176, and one or more I/O device management kernels 178. While not shown, the operating system 160 may further include one or more graphical user interface kernels, one or more security kernels, and/or one or more networking kernels.

The operating system 160 may be further divided based on function. For example, the operating system may be divided into a user application operating system, a system application operating system, and a communication operating system. In this instance, each division of the operating system includes a section that includes one or more processes 166-170 and a kernel section for management functions 172-178. Alternatively stated, wireless communication functions of the handheld computing unit have their own operating system; user applications of the handheld computing unit have their own operating system; and system applications of the handheld computing unit have their own operating system.

In general, the kernel section 164 functions to connect an application to the hardware resources of a computing device. In this regard, the kernel section 164 manages the computing device's resources (e.g., multi-processing capabilities, processing module run time, main memory, hard disk memory, network throughput, I/O devices, communication between hardware and software components, etc.) and provides the lowest-level software abstraction layer. Note that the kernel section 164 may include monolithic kernels and/or microkernels.

The process management kernel section 172 provides one or more kernels to allow and support execution of one or more processes. A process is the execution of an application's operating instructions and several processes may be associated with the same application. When the handheld computing unit is in a remote mode, the HH processing module may function as a single central processing unit that executes one instruction at a time. In this embodiment, the HH processing module may use a time-sharing process to allow seemingly concurrent execution of multiple processes. In another embodiment, the HH processing module includes a multi-processor core that supports actual concurrent execution of multiple processes, where each processing core may use the time-sharing process to allow more processes to run at once. When the handheld computing unit 12 is in the extended mode or the network mode, the HH processing module and the EXT processing module or the other HH computing unit's processing modules function collectively to provide the multi-processor core. Note that each of the HH and EXT processing modules may include its own multi-processor core such that, when functioning collectively, the number of processors is further increase.

To run an application, a kernel of the process management kernel section 172 sets up an address space for the application, loads the file containing the application's code into memory, sets up a stack for the application and branches to a given location inside the application to start its execution. Several applications may be supported by using multi-tasking kernels, pre-emptive multi-tasking kernels, cooperative multi-tasking kernels, and/or multiprocessing. A multi-tasking kernel schedules access to the HH processing module and/or EXT processing module among a plurality of processes in an orderly manner. The scheduling may be done in a variety of ways including multiprogramming, time-sharing, and real-time.

A pre-emptive multi-tasking kernel allocates each process a slice of time and switches from process to process in accordance with the time slices to provide the illusion of concurrent execution. The size of the time slices may vary from process to process and may be adjusted and/or reallocated based on priority of other processes. The kernel also provides a mechanism for the processes sharing the processing resources to communication with one another, which is generally referred to as inter-process communication (IPC), which may be done by sharing memory, message passing, and/or a remote procedure calls.

A cooperative multi-tasking kernel allows a process to run uninterrupted until it makes a special request that tells the kernel it may switch to another process. The special request may be the result of a response to an inter-process communication or the process is waiting for an event to occur.

A multiprocessing kernel allows different processes and/or threads to run on different processors (e.g., one or more of the HH processing modules and the EXT processing module). The kernel provides a synchronization mechanism to ensure that no two processors attempt to modify the same data at the same time.

The memory management kernel section 174 provides one or more kernels to control access to the HH main memory, the HH hard disk/flash memory, the EXT main memory, and/or the EXT hard disk/flash memory. In general a memory management kernel has full access to the computing device's memory and controls a process' access to the memory. This includes establishing virtual addressing using paging and/or segmentation. The virtual address spaces may be different for different processes (e.g., the memory that one process accesses at a particular (virtual) address may be different memory from what another process accesses at the same virtual address). The operating system maintains a page table to track the virtual addresses association to physical addresses and the allocation of the virtual memory to particular processes. The virtual memory allocations are tracked so that when a process terminates, the memory used by that process can be made available for other processes. In this manner, the memory management kernel allows each process to function as if it the only process running.

The file system management kernel section 176 includes one or more kernels to control a file system for file storage and/or file transfers. The file system uses the EXT hard disk/flash memory, the EXT CD-ROM drive, the HH hard disk/flash memory, etc. to store and organizes files and/or applications for ease of finding and accessing. In an embodiment, the file system includes directories that associate file names with files. This may be done by connecting the file name to an index into a file allocation table. The directory structure may be flat (no subdirectories) or hierarchical (includes subdirectories). The directory may further include meta data regarding a file. The meta data may include file length, a byte count, time the file was last modified, file creation time and/or date, time and/or date the file was last accessed, any changes to the meta data, owner's identity, creator's identity, access permission settings, etc.

The file system may be a disk file system, a flash file system, a database file system, a transactional file system, and/or a special purpose file system. In an embodiment, each of the various modes of the operating system has its own file system. For example, the remote mode operating system has a file system that utilizes the HH hard disk/flash memory 54; the quasi docked mode operating system has a file system that has a hierarchical preference for the HH hard disk/flash memory 54 over the EXT hard disk/flash memory 84; and the docked mode operating system has a file system that has a hierarchical preference for the EXT hard disk/flash memory 84 or the HH hard disk/flash memory 54.

The I/O device management kernel section 178 includes one or more kernels that manage I/O device processing resource and/or memory resource allocation requests. As an example, a process may need to access an I/O device (e.g., the HH display), which is controlled by the kernel through a device driver. As a more specific example, to show the user something on the HH display, an application would make a request to the kernel, which would forward the request to its display driver, which plots the character/pixel for display.

The operating system 160 may security features. The security may include levels: internal security and external security. The internal security is the protection of the computing device's resources from concurrently running applications performing the same process at the same time. In this instance, applications and/or processes thereof are assigned a privilege level, which blocks less privileged applications and/or processes from using certain hardware instructions, certain processing resources, accessing certain memory spaces, etc. When an application or process is blocked, it must ask a higher privileged application or process to perform the task for it.

For external security, the computing device may include a software firewall or an intrusion detection/prevention system. The software firewall is configured to allow or deny network traffic to or from a service or application running on the operating system.

The operating system 160 further includes graphical user interfaces (GUI) for the handheld computing unit and the extended computing unit. The GUI may be for a touch screen, a keypad, an LCD display, a monitor, and vary depending on the applications being used. For example, when the handheld computing unit is in a cellular telephone mode, the GUI may be adapted for the cell phone. As another example, when the handheld computing unit is a GPS receiver mode, the GUI may be adapted to for GPS operations. When the handheld computing unit is docked to the extended computing unit, the GUI may resemble a personal computer and/or laptop GUI.

Figure 14:
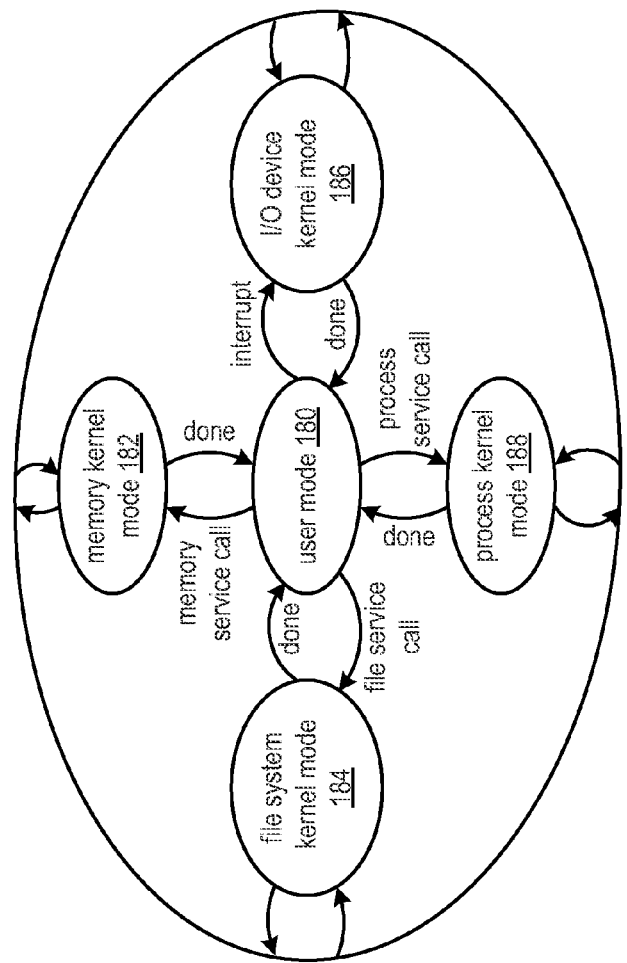
FIG. 14 is a state diagram of an embodiment of an operating system in accordance with the present invention.

FIG. 14 is a state diagram of an embodiment of the operating system 160. The operating system 160 may be in the remote mode, the quasi docked mode, or the docked mode. In any of these modes, the operating system has five states: a user mode 180, a memory kernel mode 182, a file system kernel mode 184, an I/O device kernel mode 186, and a process kernel mode 188. From the user mode state 180, the operating system may transition to any one of the kernel states in response to a service call or a trap. In a kernel state, the operating system may transition to any other kernel state or back to the user mode state.

As an example, assume that the handheld computing unit is in the remote mode and is executing a user application and the operating system is in the user mode state 180 for this user application. The executing of the user application includes one or more processes that require access to the HH computing unit's resources. When a process needs a resource, it generates a service call and/or evokes a trap. When the process service call or the trap is detected, the operating system transitions to the process kernel state 188 for a process service call, to the I/O kernel mode for an I/O service call, to the memory kernel mode 182 for a memory service call, or to the file system kernel mode for a file service system call. Assuming that the service call was a process service call, the operating system is in state 188 and beings to process the process service call. The process service call may be to have a series of operational instructions executed by the HH processing module, may be to store data, may be to read data, may be use certain data while executing the operational instructions, may be to display data, may be to receive data, etc.

If the process service call is to execute operational instructions, the process management kernel schedules the process for access to the HH processing module based on the state of the process. A process may be in a blocked state, a running state, or a ready state. If the process is in a blocked state, it is dependent on some other process, memory management function, and/or file management function to be completed before it can execute its current task. When the dependency is removed, the process transitions into the ready state. The process remains in this state until the resource it has requested is allocated to it. When allocated, the process transitions to the running state.

After the process is scheduled and/or the process is completed, the operating system transitions back to the user state 180. If the process service call includes requesting access to the processing module and to store the results, the operating system would also transition to the memory kernel state 182 and the file system kernel state 184 to fulfill the storage request service call.

When an I/O device desires access to the processing module, to a file, and/or to the memory, it issues an interrupt. When the operating system receives the interrupt, it transitions to the I/O device kernel mode to process the interrupt, which may be for access to the file system, access to the processing module, and/or access to the memory. As such, from the I/O kernel state 186, the operating system may transition to the process kernel state 188, the file system kernel state 184, and/or to the memory kernel state 182. Note for from application to application and/or process to process, the operating system may be in different states at any one time.

Figure 15:
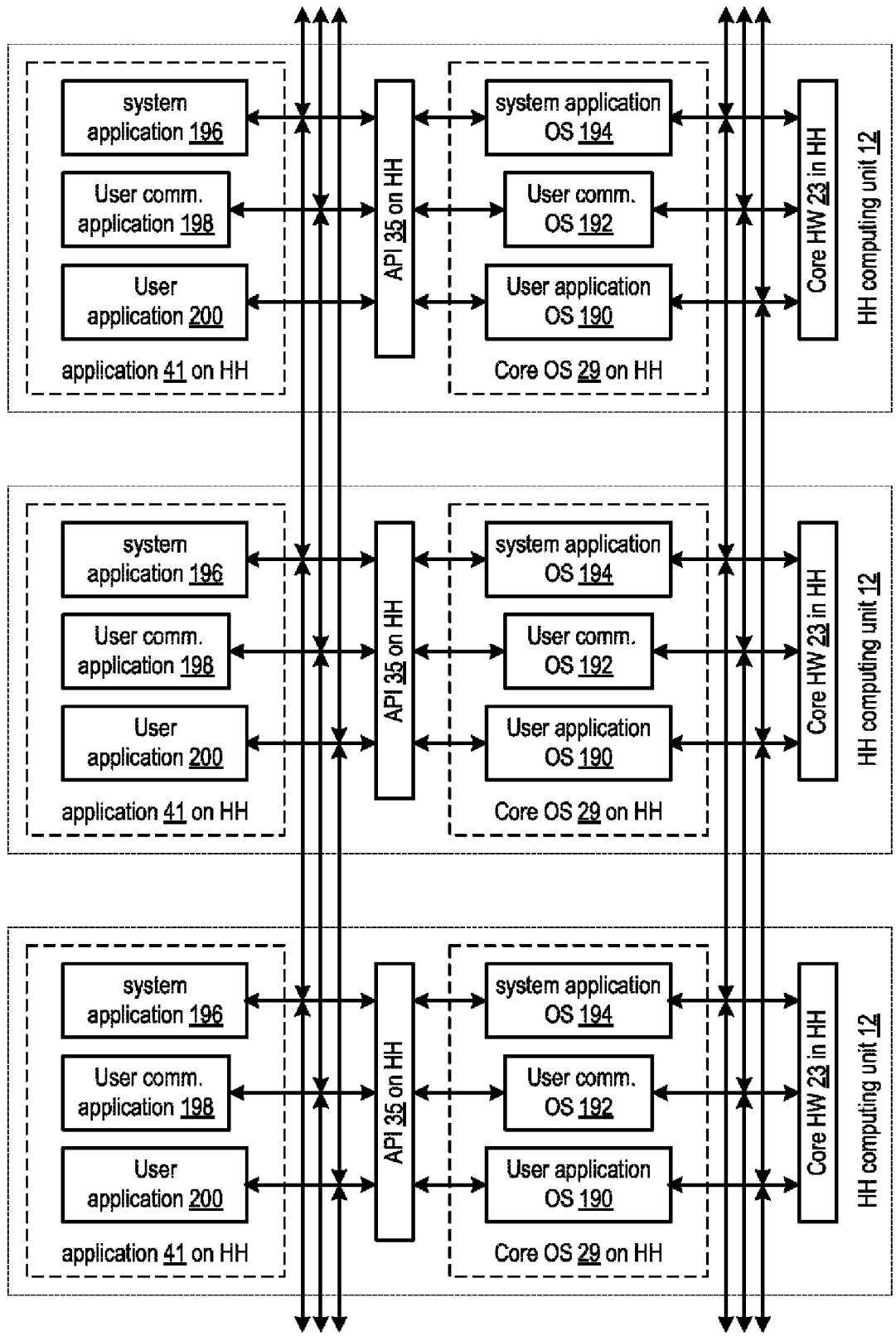
FIG. 15 is a schematic block diagram of another embodiment of a networked computing device that includes a plurality of handheld computing units in accordance with the present invention.

Further examples of service calls include:
Process Management
   create a child process
   create a process (at system initiation, per system call, per user request, per batch job)
   delete a process (normal, error, fatal error, killed by another process)
   wait for child to terminate
   replace a process' core image
   terminate process execution and return status
File Management
   open a file for reading and/or writing
   close an open file
   read data from a file into a buffer
   write data from a buffer into a file
   move the file pointer
   get file status information Directory and File System Management
  create a new directory
  remove an empty directory
  create a new entry, name, name pointer (shortcut)
  remove a directory entry
  mount a file system
  unmount a file system FIG. 15 is a schematic block diagram of another embodiment of a networked computing device that includes a plurality of handheld computing units. In this embodiment of the network computing device 95 includes the various sections 23, 29, 35, and 41 interoperably coupled via the MMW transceivers 85. The hardware sections 23 may coupled in series, parallel, or a combination thereof. Each of the operating system section 29 includes a user communication section 192, a system application section 194, and a user application section 190. Each of the application section includes a user application section 200, a system application section 196, and a user communication section 198.

Via the MMW transceivers, an almost endless number of combinations of configurations can be implemented. For example, a first portion of the hardware section may be processing a standalone function and a second portion of the hardware section may be processing a network function. As another example, a first portion of the operating system section may be processing a standalone function and a second portion of the operating system section may be processing a network function. As yet another example, a first portion of the application section may be processing a standalone function and a second portion of the application section may processing a network function.

Figure 16:
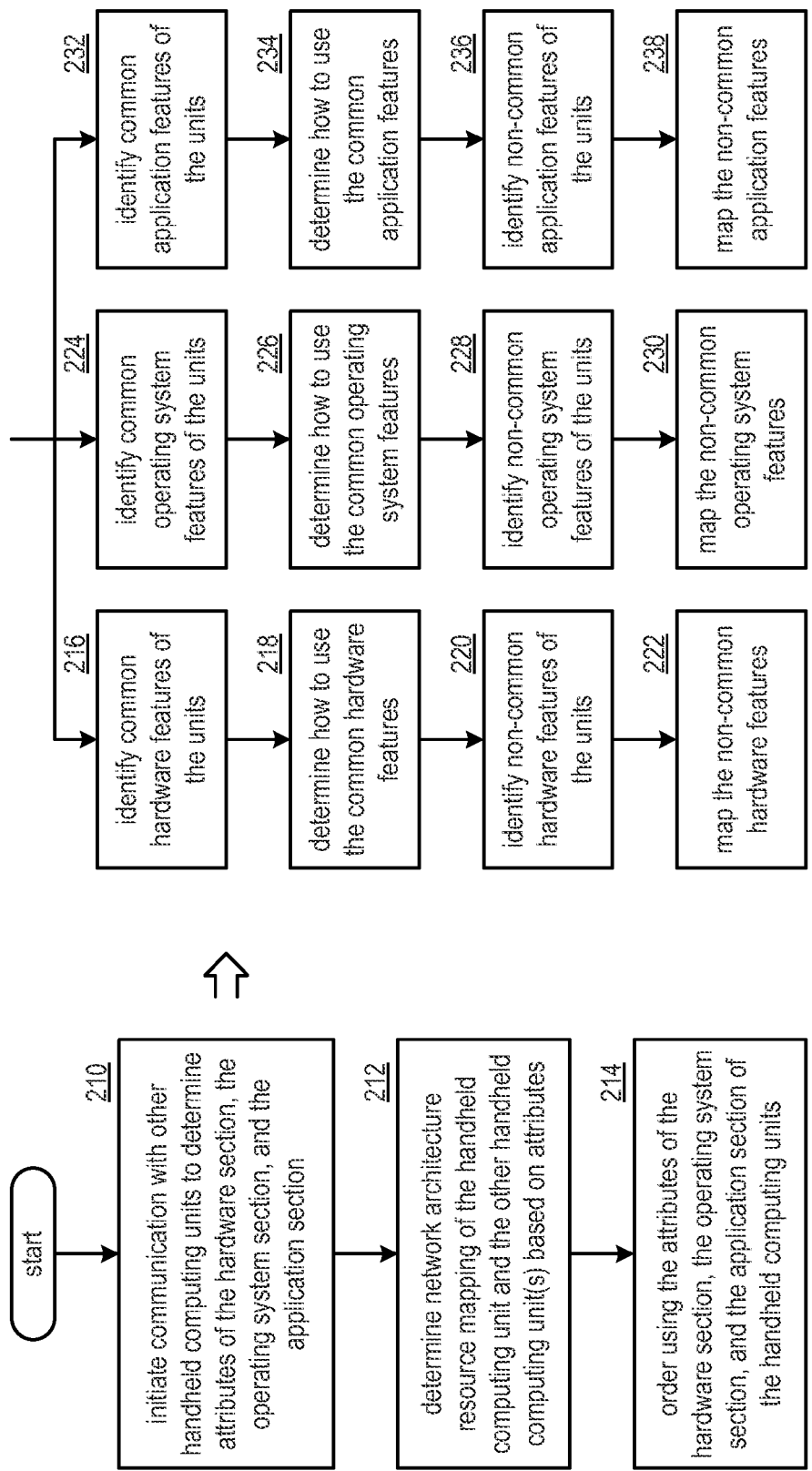
FIG. 16 is a logic diagram of an embodiment of a method for networking a plurality of handheld computing units in accordance with the present invention.

FIG. 16 is a logic diagram of an embodiment of a method for networking a plurality of handheld computing units. One or more of the handheld computing units may execute a network coordinator application via its hardware section to set up and/or maintain the wireless network and/or the network computing device 95. At step 210, a handheld processing module initiates communication with the at least one other handheld computing unit to determine attributes of the hardware section, the operating system section, and the application section of the at least one other handheld computing unit. The attributes include, but are not limited to, type and capability of the processing modules, amount and type of memories, amount and type of data input and output interfaces, a listing of user applications, a listing of system level applications, a listing of operating system kernels, etc.

The method continues at step 212 where the handheld computing unit determines network architecture resource mapping of the handheld computing unit and the at least one other handheld computing unit based on the attributes. For example, the unit determines, for each of the handheld computing units in the wireless network, which hardware resources to use and in what manner, which user applications to use and in what manner, and/or which operating system kernels to use and in what manner.

The method continues at step 214 where the unit orders use of the attributes of the hardware section, the operating system section, and the application section of the at least one other handheld computing unit and of the handheld computing unit. For example, the unit selects which processing modules will perform which types of functions as a primary processor and as a co-processor, which operating system kernels from which units will support particular operations, etc.

Steps 216-238 outline the steps to determine the attributes of the hardware section, the operating system section, and the application section of the at least one other handheld computing unit. In particular, the steps cover:

identify common hardware features between the handheld computing unit and the at one other handheld computing unit;
for each common hardware feature, determine whether to utilize the common hardware feature in one or more of the handheld computing unit and the at least one other handheld computing unit;
identify common operating system features between the handheld computing unit and the at one other handheld computing unit;
for each common operating system feature, determine whether to utilize the common operating system feature in one or more of the handheld computing unit and the at least one other handheld computing unit;
identify common application features between the handheld computing unit and the at one other handheld computing unit;
for each common application feature, determine whether to utilize the common application feature in one or more of the handheld computing unit and the at least one other handheld computing unit;
identify non-common hardware features between the handheld computing unit and the at one other handheld computing unit;
map each non-common hardware feature to the handheld computing unit or to the at least one other handheld computing unit;
identify non-common operating system features between the handheld computing unit and the at one other handheld computing unit;
map each non-common operating system feature to the handheld computing unit or to the at least one other handheld computing unit;
identify non-common application features between the handheld computing unit and the at one other handheld computing unit; and
map each non-common application feature to the handheld computing unit or to the at least one other handheld computing unit.

In another embodiment steps 216-238 cover:
identify common processing module features between the handheld computing unit and the at one other handheld computing unit;
for each common processing module feature, determine whether to utilize the common processing module feature in one or more of the handheld computing unit and the at least one other handheld computing unit;
identify common IO module features between the handheld computing unit and the at one other handheld computing unit;
for each common IO module feature, determine whether to utilize the common IO module feature in one or more of the handheld computing unit and the at least one other handheld computing unit;
identify common operating system features between the handheld computing unit and the at one other handheld computing unit;
for each common operating system feature, determine whether to utilize the common operating system feature in one or more of the handheld computing unit and the at least one other handheld computing unit;
identify common application features between the handheld computing unit and the at one other handheld computing unit;

for each common application feature, determine whether to utilize the common application feature in one or more of the handheld computing unit and the at least one other handheld computing unit;

identify non-common processing module features between the handheld computing unit and the at one other handheld computing unit;

map each non-common processing module feature to the handheld computing unit or to the at least one other handheld computing unit;

identify non-common IO module features between the handheld computing unit and the at one other handheld computing unit;

map each non-common IO module feature to the handheld computing unit or to the at least one other handheld computing unit;

identify non-common operating system features between the handheld computing unit and the at one other handheld computing unit;

map each non-common operating system feature to the handheld computing unit or to the at least one other handheld computing unit;

identify non-common application features between the handheld computing unit and the at one other handheld computing unit; and map each non-common application feature to the handheld computing unit or to the at least one other handheld computing unit.

FIG. 17 is a diagram of an embodiment of an example of an attribute mapping table 240 of common (e.g., more than one handheld computing unit has the attribute) and non-common attributes (e.g., only one handheld computing unit has the attribute). The attribute mapping 240 includes a hardware section, an operating system section, a user application section, and a system application section. Each section includes a column identifying the handheld computing unit and another column for the particular features or attributes.

In this example, the first handheld computing unit includes hardware of a 1.8 GHz processing, a high resolution graphics engine and display, a keypad, and peripheral interfaces (e.g., digital image capture, etc.). The second handheld computing unit includes a 2.0 GHz processing, a touch pad graphical user interface, and the peripheral interfaces. The third handheld computing unit includes a 1.6 GHz processor, a keypad, and a graphics display, and the peripherals. In this example, the common hardware features are the peripheral interfaces and the processors (even though they are of different types). The non-common features are the display interfaces. With respect to the hardware, the three processors may be used in a variety of ways for the network computing device 95. For instance, the 2.0 GHz processor may be selected to provide all of the processor functions for the network computing device. As another example, the processors may be used collectively as a multiple processor structure.

The first handheld computing unit includes a handheld operating system version 1.0 as does the third handheld computing unit. The second handheld computing unit includes a handheld operating system version 2.0, which includes separate operating systems for user applications, system applications, and communication applications. The first version of the operating system may not include separate operating system section as included in version 2.0. In this instance, the operating systems may be used in a wide variety of configurations to support the network computing device 95 and the individual operations of the handheld computing units. Similar options are available for the user applications and the system applications.

Figure 18:
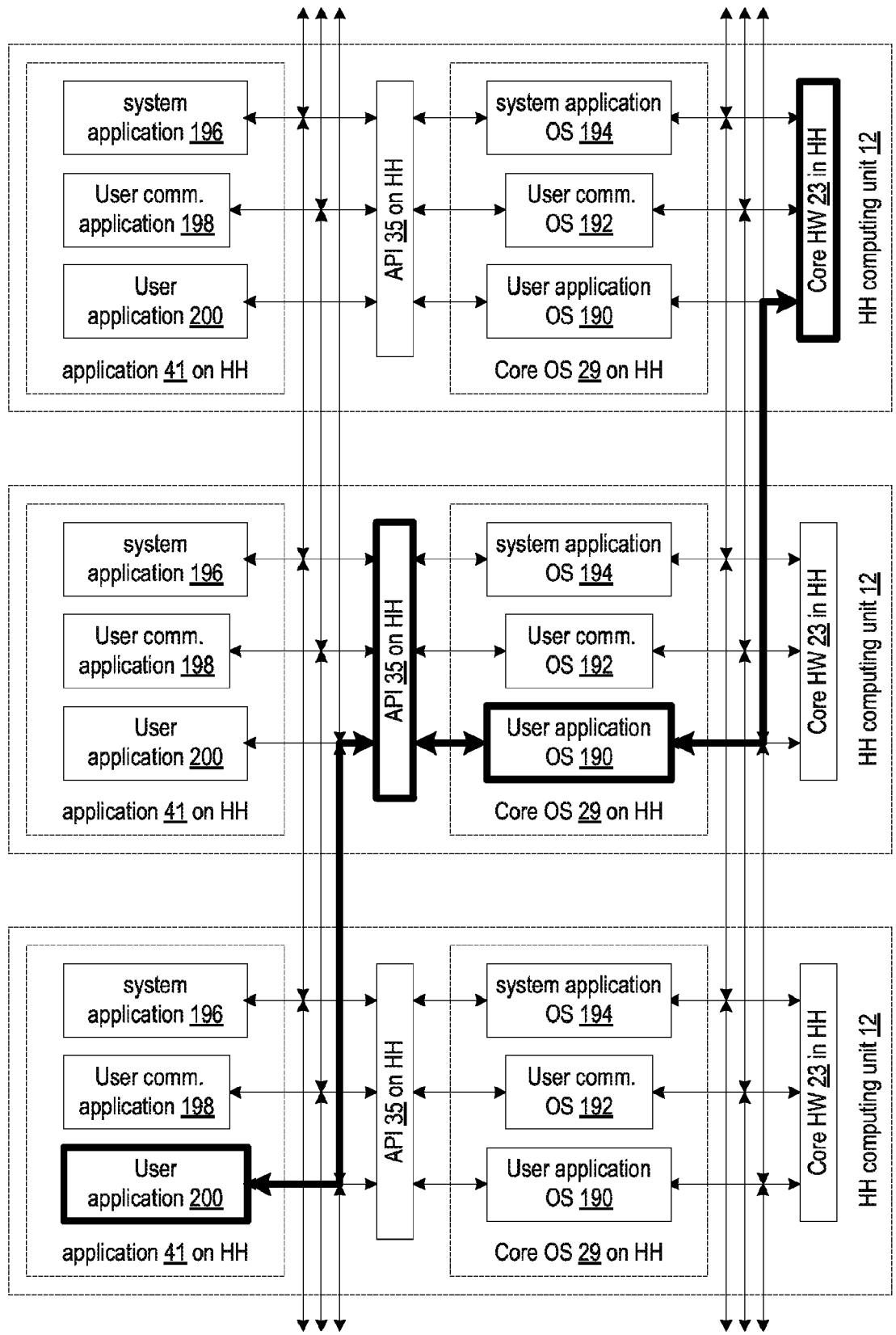
FIG. 18 is a schematic block diagram of another embodiment of a networked computing device that includes a plurality of handheld computing units in accordance with the present invention.

FIG. 18 is a schematic block diagram of another embodiment of a networked computing device that includes a plurality of handheld computing units configured to provide a specific wireless network function. In this example, the user application (e.g., word processing, spreadsheet, presentation, drawing, web browser, email, contact list, etc.) of the first handheld computing unit is being shared with the other handheld computing units. The API 35 and the user application operating system section of the second handheld computing unit is being used to provide these functions for the network computing device 95. Finally, the hardware of the third handheld computing unit is being used to provide the hardware functions for this shared application.

As can be seen from this example, an almost endless combination of hardware and software configurations can be achieved to provide shared wireless network functions when functioning as the network computing unit 95. In addition to performing the network functions, the handheld computing units can simultaneously support standalone functions or extended functions via coupling to their respective extended computing units.

FIG. 19 is a schematic block diagram of another embodiment of a networked computing device that includes a plurality of handheld computing units configured to share RF communication functions (e.g., cellular telephone calls, text message, email, internet access, etc.). In this embodiment, the RF transceiver of the first handheld computing unit supports the RF communications for the three handheld computing units. In this manner, only on RF resource is used to support three units.

In example of operation, the processing module 50 receives outbound data (e.g., voice, audio, data, etc.) from one or more of the IO modules 75 of the three units. The processing module 50 converts the outbound data from the handheld computing unit and/or the at least one other handheld computing unit into the outbound symbol stream. The RF transceiver converts the outbound symbol stream into an outbound RF signal.

The RF transceiver also converts an inbound RF signal into an inbound symbol stream. The processing module 50 converts the inbound symbol stream into inbound data for the handheld computing unit and/or at least one other handheld computing unit. The processing module then provides the inbound data to the IO module of the appropriate handheld computing unit.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A handheld computing unit comprises:
a millimeter wave (MMW) transceiver;
a hardware section operably coupled to the MMW transceiver;
an operating system section operably coupled to the hardware section; and
an application section operably coupled to the operating system section, wherein the application section includes a network coordinator application; and
wherein when the handheld computing unit is in an extended mode:
the hardware section is operably coupled to a hardware section of an extended computing unit;
the operating system section is operably coupled to an operating system section of the extended computing unit; and
the application section is operably coupled to an application section of the extended computing unit; and
wherein when the handheld computing unit is in a network mode, the hardware section is operably coupled to a hardware section of at least one other handheld computing unit via the MMW transceiver and is operable to coordinate with the network coordinator application to:
initiate communication with the at least one other handheld computing unit using the MMW transceiver;
identify common hardware features between the handheld computing unit and the at least one other handheld computing unit; and
for each common hardware feature, determine whether to utilize the common hardware feature in the at least one other handheld computing unit to perform functions for the handheld processing unit.

2. The handheld computing unit of claim 1 further comprises, at least one of, when the handheld computing unit is in the network mode:
the operating system section is operably coupled to an operating system section of the at least one other handheld computing unit; and
the application section is operably coupled to an application section of the at least one other handheld computing unit.

3. The handheld computing unit of claim 1 further comprises:
when the handheld computing unit is in a standalone mode:
the hardware section is operably coupled to perform a standalone hardware function;
the operating system section is operably coupled to perform a standalone operating system function; and
the application section is operably coupled to perform a standalone application function.

4. The handheld computing unit of claim 1, wherein the operating system section comprises:
a user communication section;
a system application section; and
a user application section.

5. The handheld computing unit of claim 1, wherein the application section comprises:
a user application section;
a system application section; and
a user communication section.

6. The handheld computing unit of claim 5 further comprises:
the hardware section including a radio frequency (RF) transceiver, wherein the RF transceiver is operably coupled to:
convert an outbound symbol stream into an outbound RF signal; and
convert an inbound RF signal into an inbound symbol stream; and
when the handheld computing unit is in the network mode:
the hardware section processes the user communication section to:
convert outbound data from the handheld computing unit and the at least one other handheld computing unit into the outbound symbol stream; and
convert the inbound symbol stream into inbound data for the handheld computing unit and the at least one other handheld computing unit.

7. The handheld computing unit of claim 1 further comprises:

when the handheld computing unit is in the network mode, the hardware section is coupled in series, parallel, or a combination thereof with the hardware section of the at least one other handheld computing unit.

8. The handheld computing unit of claim 1, wherein the hardware section further processes the network coordinate application to:
  initiate communication with the at least one other handheld computing unit to determine attributes of the operating system section and the application section of the at least one other handheld computing unit; and
  determine network architecture resource mapping of the handheld computing unit and the at least one other handheld computing unit based on the attributes.

9. The handheld computing unit of claim 8, wherein the determining the attributes of the operating system section and the application section of the at least one other handheld computing unit further comprises:
  identify common operating system features between the handheld computing unit and the at one other handheld computing unit;
  for each common operating system feature, determine whether to utilize the common operating system feature in one or more of the handheld computing unit and the at least one other handheld computing unit;
  identify common application features between the handheld computing unit and the at one other handheld computing unit; and
  for each common application feature, determine whether to utilize the common application feature in one or more of the handheld computing unit and the at least one other handheld computing unit.

10. The handheld computing unit of claim 8, wherein the determining the attributes of the hardware section, the operating system section, and the application section of the at least one other handheld computing unit further comprises:
  identify non-common hardware features between the handheld computing unit and the at one other handheld computing unit;
  map each non-common hardware feature to the handheld computing unit or to the at least one other handheld computing unit;
  identify non-common operating system features between the handheld computing unit and the at one other handheld computing unit;
  map each non-common operating system feature to the handheld computing unit or to the at least one other handheld computing unit;
  identify non-common application features between the handheld computing unit and the at one other handheld computing unit; and
  map each non-common application feature to the handheld computing unit or to the at least one other handheld computing unit.

11. The handheld computing unit of claim 8, wherein the network architecture resource mapping further comprises:
  an ordering of using the attributes of the hardware section, the operating system section, and the application section of the at least one other handheld computing unit and of the handheld computing unit.

12. A handheld computing unit comprises:
  a millimeter wave (MMW) transceiver;
  memory;
  a processing module;
  an input/output (IO) module; and
  a MMW bus structure operably coupled to the MMW transceiver, the memory, the processing module, and the IO module;
  wherein when the handheld computing unit is in an extended mode:
    the processing module is operably coupled to a processing module of an extended computing unit;
    the memory is operably coupled to memory of the extended computing unit; and
    the IO module is operably coupled to an IO module of the extended computing unit; and
  wherein when the handheld computing unit is in a network mode, the handheld computing unit is coupled to at least one other handheld unit via the MMW bus structure and:
    the processing module is operably coupled via the MMW bus structure to a processing module of the at least one other handheld computing unit such that the handheld computing unit is operable to utilize the processing module of the least one other handheld computing unit;
    the memory is operably coupled to memory of the at least one other handheld computing unit such that the handheld computing unit is operable to utilize the memory of the least one other handheld computing unit; and
    the IO module is operably coupled to an IO module of the at least one other handheld computing unit such that the handheld computing unit is operable to utilize the IO module of the least one other handheld computing unit.

13. The handheld computing unit of claim 12, wherein the memory comprises:
  an operating system section; and
  an application section, wherein, when the handheld computing unit is in the network mode:
    the operating system section is operably coupled to an operating system section of the at least one other handheld computing unit; and
    the application section is operably coupled to an application section of the at least one other handheld computing unit.

14. The handheld computing unit of claim 13, wherein the operating system section comprises:
  a user communication section;
  a system application section; and
  a user application section.

15. The handheld computing unit of claim 13, wherein the application section comprises:
  a user application section;
  a system application section; and
  a user communication section.

16. The handheld computing unit of claim 15 further comprises:
  a radio frequency (RF) transceiver, wherein the RF transceiver is operably coupled to:
    convert an outbound symbol stream into an outbound RF signal; and
    convert an inbound RF signal into an inbound symbol stream; and
  when the handheld computing unit is in the network mode:
  the processing module processes the user communication section to:
    convert outbound data from the handheld computing unit and the at least one other handheld computing unit into the outbound symbol stream; and convert the inbound symbol stream into inbound data for the handheld computing unit and the at least one other handheld computing unit.

17. The handheld computing unit of claim 13, wherein the application section comprises:
a network coordinator application, wherein the processing module processes the network coordinate application to:
initiate communication with the at least one other handheld computing to determine attributes of the processing module, the IO module, the operating system section, and the application section of the at least one other handheld computing unit; and
determine network architecture resource mapping of the handheld computing unit and the at least one other handheld computing unit based on the attributes.

18. The handheld computing unit of claim 17, wherein the determining the attributes of the processing module, the IO module, the operating system section, and the application section of the at least one other handheld computing unit further comprises:
identify common processing module features between the handheld computing unit and the at one other handheld computing unit;
for each common processing module feature, determine whether to utilize the common processing module feature in one or more of the handheld computing unit and the at least one other handheld computing unit;
identify common IO module features between the handheld computing unit and the at one other handheld computing unit;
for each common IO module feature, determine whether to utilize the common IO module feature in one or more of the handheld computing unit and the at least one other handheld computing unit;
identify common operating system features between the handheld computing unit and the at one other handheld computing unit;
for each common operating system feature, determine whether to utilize the common operating system feature in one or more of the handheld computing unit and the at least one other handheld computing unit;
identify common application features between the handheld computing unit and the at one other handheld computing unit; and
for each common application feature, determine whether to utilize the common application feature in one or more of the handheld computing unit and the at least one other handheld computing unit.

19. The handheld computing unit of claim 17, wherein the determining the attributes of the processing module, the IO module, the operating system section, and the application section of the at least one other handheld computing unit further comprises:
identify non-common processing module features between the handheld computing unit and the at one other handheld computing unit;
map each non-common processing module feature to the handheld computing unit or to the at least one other handheld computing unit;
identify non-common IO module features between the handheld computing unit and the at one other handheld computing unit;
map each non-common IO module feature to the handheld computing unit or to the at least one other handheld computing unit;
identify non-common operating system features between the handheld computing unit and the at one other handheld computing unit;
map each non-common operating system feature to the handheld computing unit or to the at least one other handheld computing unit;
identify non-common application features between the handheld computing unit and the at one other handheld computing unit; and
map each non-common application feature to the handheld computing unit or to the at least one other handheld computing unit.

20. The handheld computing unit of claim 17, wherein the network architecture resource mapping further comprises:
an ordering of using the attributes of the processing module, the IP module, the operating system section, and the application section of the at least one other handheld computing unit and of the handheld computing unit.

21. A handheld computing unit comprises:
a millimeter wave (MMW) transceiver;
a hardware section operably coupled to the MMW transceiver;
an operating system section operably coupled to the hardware section;
an application section operably coupled to the operating system section; and
wherein when the handheld computing unit is in a network mode, the handheld computing unit is operably coupled to at least one other handheld computing unit via the MMW transceiver and:
the hardware section is operably coupled to a hardware section of at least one other handheld computing unit computing unit to form a common hardware resource for performing network functions;
the operating system section is operably coupled to an operating system section of the at least one other handheld computing unit computing unit to form a common operating system resource for performing network functions; and
the application section is operably coupled to an application section of the at least one other handheld computing unit computing unit to form a common application resource for performing network functions.

22. The handheld computing unit of claim 21 further comprises:
a first portion of the hardware section processing a standalone function; and
a second portion of the hardware section processing a network function with the hardware section of at least one other handheld computing unit computing unit.

23. The handheld computing unit of claim 22 further comprises:
a first portion of the operating system section processing a standalone function; and
a second portion of the operating system section processing a network function with the operating system section of the at least one other handheld computing unit computing unit.

24. The handheld computing unit of claim 22 further comprises:
a first portion of the application section processing a standalone function; and
a second portion of the application section processing a network function with the application section of the at least one other handheld computing unit computing unit.

* * * * *

UNITED STATES PATENT AND TRADEMARK OFFICE
CERTIFICATE OF CORRECTION

PATENT NO.        : 8,175,646 B2
APPLICATION NO.   : 12/393448
DATED             : May 8, 2012
INVENTOR(S)       : Ahmadreza Rofougaran It is certified that error appears in the above-identified patent and that said Letters Patent is hereby corrected as shown below:

In the Claims

Col. 29, line 21, in claim 9: after "unit and the at" insert --least--
Col. 29, line 28, in claim 9: after "unit and the at" insert --least--
Col. 29, line 40, in claim 10: after "unit and the at" insert --least--
Col. 29, line 46, in claim 10: after "unit and the at" insert --least--
Col. 29, line 52, in claim 10: after "unit and the at" insert --least--
Col. 30, line 20, in claim 12: after "module of the" insert --at--
Col. 30, line 25, in claim 12: after "memory of the" insert --at--
Col. 30, line 30, in claim 12: after "IO module of the" insert --at--
Col. 31, line 23, in claim 18: after "unit and the at" insert --least--
Col. 31, line 30, in claim 18: after "unit and the at" insert --least--
Col. 31, line 37, in claim 18: after "unit and the at" insert --least--
Col. 31, line 45, in claim 18: after "unit and the at" insert --least--
Col. 31, line 63, in claim 19: after "unit and the at" insert --least--
Col. 32, line 2, in claim 19: after "unit and the at" insert --least--
Col. 32, line 8, in claim 19: after "unit and the at" insert --least--
Col. 32, lines 32-33, in claim 21: replace "computing unit computing unit" with --computing unit--
Col. 32, lines 41-42, in claim 21: replace "computing unit computing unit" with --computing unit--
Col. 32, line 50, in claim 22: replace "computing unit computing unit" with --computing unit--
Col. 32, lines 57-58, in claim 23: replace "computing unit computing unit" with --computing unit--
Col. 32, line 65, in claim 24: replace "computing unit computing unit" with --computing unit--

Signed and Sealed this
Twenty-eighth Day of January, 2014

Michelle K. Lee
*Deputy Director of the United States Patent and Trademark Office*